United States Patent [19]
Hashimoto et al.

[11] Patent Number: 5,410,494
[45] Date of Patent: Apr. 25, 1995

[54] ELECTRONIC MEASURING APPARATUS FOR MEASURING OBJECTS OF A FIGURE OR ON A MAP

[75] Inventors: Mikio Hashimoto, Nara; Makoto Miyago, Osaka; Yasunobu Tagusa, Ikoma; Yuji Yamamoto, Kobe; Yoshihiro Hattori, Tenri, all of Japan

[73] Assignee: Sharp Kabushiki Kaisha, Osaka, Japan

[21] Appl. No.: 44,040

[22] Filed: Apr. 8, 1993

[30] Foreign Application Priority Data

Apr. 8, 1992 [JP] Japan .................................. 4-087299
Mar. 16, 1993 [JP] Japan .................................. 5-056073

[51] Int. Cl.⁶ .......................................... G01B 21/28
[52] U.S. Cl. ...................................... 364/560; 364/564
[58] Field of Search ................. 364/560, 564; 33/123; 395/161

[56] References Cited

U.S. PATENT DOCUMENTS

| | | | |
|---|---|---|---|
| 3,571,932 | 3/1971 | Peddie ................................ | 33/123 |
| 4,688,184 | 8/1987 | Taniguti et al. .................... | 364/560 |
| 4,887,230 | 12/1989 | Noguchi et al. .................... | 364/560 |
| 5,195,179 | 3/1993 | Tokunaga .......................... | 395/161 |
| 5,228,124 | 7/1993 | Kuga et al. ........................ | 395/161 |
| 5,239,489 | 8/1993 | Russell .............................. | 364/560 |

FOREIGN PATENT DOCUMENTS

| | | |
|---|---|---|
| 62-173300 | 7/1987 | Japan . |
| 63-17098 | 1/1988 | Japan . |
| 63-275901 | 11/1988 | Japan . |
| 64-40399 | 2/1989 | Japan . |
| 192601 | 4/1989 | Japan . |
| 1153901 | 6/1989 | Japan . |

*Primary Examiner*—Emanuel T. Voeltz
*Assistant Examiner*—Thomas Peeso

[57] ABSTRACT

An electronic measuring apparatus is placed on a drawing or other material on which a measuring object is drawn. The apparatus has a main display of a dot matrix liquid crystal display having a touch sensor. A plurality of points corresponding to the measuring object such as a graphic are entered as specific points. A calculating section calculates lengths of a straight line and a curve, an angle between two straight lines, or regional area of a region based on coordinate data of the respective specified points. The calculated results are shown on the main display. With the arrangement, the respective measurings of the length, angle, regional area, and other measuring object are carried out with ease and high accuracy. Moreover, a variety of processings such as unit conversion and scale factor conversion can be carried out only by entering respective specific data.

59 Claims, 18 Drawing Sheets

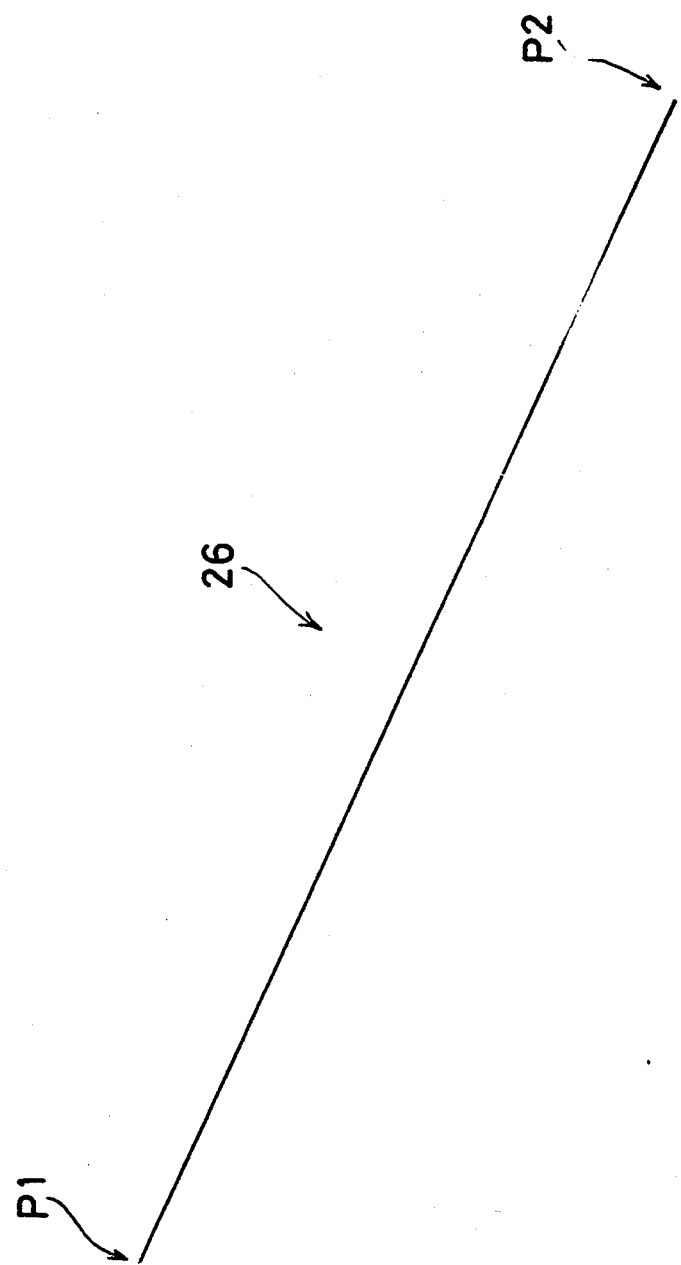

ELECTRONIC MEASURING APPARATUS FOR MEASURING OBJECTS OF A FIGURE OR ON A MAP

FIELD OF THE INVENTION

The present invention relates to an electronic measuring apparatus for measuring objects on a figure or on a map such as a distance, length, a regional area, and an angle, the measuring objects being drawn for example in an equally scaled manner, in an enlarged manner, or in a reduced manner.

BACKGROUND OF THE INVENTION

A conventional scale is used in order to measure a dimension or a distance on a figure and on a map which are drawn in an enlarged manner or in a reduced manner, the conventional scale having its fixed contraction scale or its fixed scale. The typical conventional scale is shown in FIG. 20 as a triangular scale 41 which has a shape of triangle pole for example. The triangular scale 41 has a total of three measuring planes for measuring the distance or other measuring objects. According to the front view of the triangular scale 41, each measuring plane has a shape of substantially a rectangle which are enclosed by four sides. The respective longer two sides thereof has different graduation lines of respective reductions and enlargements. More specifically, there are six kinds of graduation lines since each rectangular measuring plane of the three measuring planes has two kinds of graduation lines. The following is one example of a set of contraction scales: 1/100, 1/200, 1/300, 1/400, 1/500, and 1/600. Hereinafter, the respective six kinds of graduation lines are referred to as a graduation lines group. Namely, for example, each of six kinds of graduation lines of 1/100, 1/200, 1/300, 1/400, 1/500, and 1/600 is referred to as a graduation line group.

When a distance on the map is measured by the use of the triangular scale 41 having the above-mentioned structure, after selecting one of the six graduation lines group which coincides with the contraction scale of the map, the triangular scale 41 is set such that the selected graduation lines group is placed in the vicinity of a target region to be measured. Thereafter, the target distance is measured based on the read out graduation lines.

By the way, an angle has been conventionally measured by the use of a protractor by directly reading out the graduation lines marked on the protractor. Alternatively, when the protractor is not available but a straight scale, which can measure a distance, and a triangular scale having a right angle (90°) are available, the plotting by the use of these scales is carried out. Thereafter calculation for the angle with a portable calculator dealing with functional calculus is carried out by the use of the Pythagorean theorem and the inverse trigonometric functions ($\sin^{-1}$, $\cos^{-1}$, $\tan^{-1}$, and so on), thereby obtaining the target angle. These procedures for measuring the target angle require relatively many proceeding steps. In that case, a triangular scale having at least one side, on which graduation lines are marked, alone may be used instead of using the above-mentioned straight scale and triangular scale.

The following deals with the way to obtain the target angle based on the calculation by the plotting with the straight scale and triangular scale.

It is assumed that an angle made by two straight lines which are not parallel with each other should be measured. A perpendicular is plotted from a point on one of the two straight lines to the other straight line. Note that the straight line may be a line segment or may be a half line. After the plotting, as a right triangle can be made by the perpendicular and the two straight lines, the lengths of at least two sides of the right triangle is measured. The remaining one side of the right triangle can be obtained by the use of the Pythagorean theorem. And, the target angle can be calculated based on the lengths of the three sides of the right triangle by the use of the portable calculator or other device.

However, the above-mentioned triangular scale 41 has the following variety of problems.

More specifically, the contraction factor and the scale factor are restricted to for example six kinds or so according to the triangular scale 41. Accordingly, the dimension and distance on the map or on the figure, which is drawn in other contraction factor and scale factor than the above factors such as 1/150, 1/250, 1/350, 1/900, 1/1356, and 1/12937, can not be measured by the conventional triangular scale 41.

Moreover, when the conventional scale has a shape of tetragonometric, hexagonometric, heptagonometric, or octagonometric instead of trigonometric, only eight kinds, twelve kinds, fourteen kinds, sixteen kinds of graduation line groups can be respectively marked thereon. Even in the case of the triangular scale 41, it is not easy-to-use because the shape thereof is of trigonometric. Therefore, it takes more time for the measurement than an ordinary scale of flat plate. This ensures that the more kinds of graduation lines group the scale has, the worse operability the scale has. Accordingly, the scales having the shape such as tetragonometric can not be adapted to the actual measurement.

There are many kinds of units of the length such as milimeter (mm), centimeter (cm), meter (m), kilometer (km), inch (inch), feet (ft), angstrom (Å), micron ($\mu$m), Japanese shaku, yard (yard), and mile (mile). However, the conventional scale has about one kind of unit marked thereon. Accordingly, the conventional scales can not measure the figure and map which have arbitrary contraction factor or scale factor by the direct reading of the graduation lines of the scale. More specifically, when other unit than that marked on the scale is needed, the portable calculator or other apparatus is timely used for the unit conversion. For example, the unit conversion is carried out from 98 cm into the corresponding inch, thereby prolonging the required time for the measurement and thereby leading the conversion in error.

In case of the triangular scale 41, it is required to concentrate on the small graduation lines so as to measure the measuring object as accurate as possible, thereby causing the eyes of the operator to get fatigued. In especial, when the measurements of the length (or distance) should be carried out repeatedly, the fatigues are accumulated, thereby making the operability remarkably worse.

Moreover, it is impossible for the conventional scale to measure a curve length. The conventional scale can measure the curve length when it is assumed that the curve is comprised of a plurality of small line segments. In that case, the measuring numbers corresponding to that of the small line segments is required for measuring the curve length. In order to do so, much labor is not only required but also big errors occurred due to the accumulation of the respective measuring errors.

When a predetermined regional area is measured, it is required to carry out the conversion of the unit and the complicated calculations by the use of the portable calculator or other device. Moreover, when the regional area is drawn in reduction or enlargement manner, it takes remarkable long time for the calculations of the regional area. So, the conventional scale has the deficit that it is impossible to accurately measure a regional area when the regional area has a complicated shape.

The conventional angle measurement has the following problems.

More specifically, when the protractor is used for the angle measurement, like the triangular scale case, it is required that the operator concentrates on the small graduation lines so as to measure the measuring object as accurate as possible, thereby causing the eyes of the operator to get fatigued. In especial, when the measurements of the length (or distance) should be carried out repeatedly, the fatigues are accumulated, thereby making the operability remarkably worse.

In contrast, when the angle measurement is carried out by the use of the straight scale and triangular scale, it is required to carry out the remarkable complicated plotting until getting the calculated results. In addition thereto, it is required to directly plot with respect to a master drawing sheet wherein the two straight lines associated with the angle to be measured, thereby causing the master drawing sheet to be remarkably dirty.

SUMMARY OF THE INVENTION

It is an object of the present invention to provide an electronic measuring apparatus which can measure with ease, accuracy, and high speed the measuring objects on a figure and on a map such as a dimension, a length, and a regional area, the measuring objects being drawn in an arbitrary contraction scale and scale factor.

In order to achieve the foregoing object, an electronic measuring apparatus in accordance with the present invention comprises:

plane entering means for entering graphic data of a measuring object by specifying a plurality of points;

graphic data generating means for generating coordinate data in response to the specified points within the plane entering means;

calculating means for carrying out a predetermined calculation based on the coordinate data; and display means for displaying the calculated results of the calculating means.

The calculating means is preferably arranged such that a distance between the two points specified by the plane entering means is calculated. The calculating means is also preferably arranged such that a distance, along serially specified points, between a start point and an end point of the specified points of the plane entering means. The calculating means is preferably arranged so as to calculate a regional area of a closed-loop based on the coordinate data corresponding to the plurality of specified points by the plane entering means, the specified points defining the closed-loop.

With the arrangement, when the plane entering means enters the graphic data of the measuring object by specifying the points within the plane entering means, graphic data generating means generates the coordinate data varying depending on the specified points. The calculating means calculates (1) the distance between the two specified points, (2) the distance, along the serially specified points, between the start and end points of the specified points, and (3) the regional area of the closed-loop. The calculated results are displayed by the display means.

Thus, the desired calculations regarding the entered graphic data are carried out with high speed and accuracy only by specifying the points within the plane entering means. Accordingly, the present invention can measure with ease and high accuracy the measuring object such as a curve length and a regional area, these having so complicated shape, which can not be measured without difficulty or can be measured with error, by the conventional scale.

The calculating means preferably calculates a diameter and a radius of a circle based on the coordinate data corresponding to the circle when the closed-loop defines the circle. Thus, when the circle is specified as the closed-loop within the plane entering means, the graphic data generating means generates the coordinate data corresponding to the circle. The calculating means calculates the diameter and radius of the circle respectively based on the coordinate data. Thereafter, the calculated diameter and radius are displayed by the display means.

The electronic measuring apparatus of the present invention preferably further comprises scale factor entering means for entering specific scale factor data, wherein the calculating means calculates the conversion of the scale factor of the measuring object according to the specific scale factor data.

The electronic measuring apparatus preferably further comprises unit conversion entering means for entering specific unit conversion data, wherein the calculating means calculates the unit conversion of the measuring object according to the specific unit conversion data.

With the arrangement, the present apparatus does not have the restrictions as the conventional scale. More specifically, according to the conventional scale, the scale factor and unit are respectively restricted to a specific ones (i.e., fixed scale factor and fixed unit). More specifically, according to the present apparatus, the conversion of the scale factor and unit conversion of the measuring object, which is drawn at an arbitrary scale factor and unit, can be carried out with high accuracy and high speed only by specifying the above-mentioned data without any kinds of portable calculators.

The plane entering means is preferably a display, the display having a scope on which a cursor is displayed. The apparatus preferably further comprises cursor operating means for moving the cursor within the scope, and specific point setting means for setting a cursor position of the scope as the specific point. With the arrangement, the graphic data can be easily entered by the use of the cursor operating means and the specific point setting means.

The plane entering means is preferably a liquid crystal display having a touch sensor. In that case, the graphic data generating means generates the coordinate data in accordance with the pressed points on the display as the specified points. With the arrangement, the graphic data can be easily entered to the display by pressing the specific points on the display. In the case where a plurality of points are serially specified, the specified points can be easily moved from one point to another. So, it is possible to enter a complicated graphic pattern such as a curve in a short time, which has required long time for entering the corresponding graphic data in the past.

The electronic measuring apparatus preferably further comprises, in order to achieve the above-mentioned object, graphic trace indication controlling means for controlling the display so as to display a graphic connecting the specified points.

With the arrangement, the graphic trace indication controlling means controls the display so as to indicate the graphic connecting the specified points on the same display.

The plane entering means of the present apparatus is preferably an external entering means, the apparatus further comprising a display for displaying a graphic connecting the specified points. In that case, a desired graphic is entered from the external entering means used as the plane entering means, and the entered graphic is displayed by the display. Accordingly, the present electronic measuring apparatus is effective especially to the case where a complicated shape of graphic should be entered.

The electronic measuring apparatus preferably further comprises width dimension entering means for entering specific width dimension data, and displayed line width changing means for changing a displayed line of the graphic on the display according to the specific width dimension data.

With the arrangement, the graphic on the display can be changed in its displayed line width based on the specific width dimension data by the displayed line width changing means. Accordingly, when the displayed line of the graphic on the display is too fine or when the displayed line should be wider (or vice versa) according to some reasons, the displayed line can be changed into that having a desired width dimension of line, thereby remarkably improving the operability of the present electronic measuring apparatus.

The present electronic measuring apparatus preferably further comprises deleting region entering means for entering specific deleting region data, re-display entering means for entering specific re-displaying data, and graphic changing means for deleting a predetermined region of the graphic on the display in accordance with the specific deleting region data and for storing the deleted graphic so as to re-display the deleted graphic based on the specific re-displaying data.

With the arrangement, the graphic changing means carries out the deletion and re-displaying of the graphic on the display in accordance with the specific deleting region data and specific re-displaying data respectively. Accordingly, when a graphic is mistakenly entered and displayed on the display, the desired region of the graphic can be deleted and the deleted graphic is serially stored, thereby re-displaying according to the request thereof.

The display means of the present apparatus is preferably the above-mentioned kind of display, the apparatus further comprising calculated result indication controlling means for controlling the display so as to display the calculated results of the calculating means on a predetermined region of the display. With the arrangement, the calculated result indication controlling means controls the display so as to display the calculated results of the calculating means on the predetermined region of the display.

The electronic measuring apparatus preferably further comprises entering keys, function keys group, computing means for computing according to the entered data through the entering keys and function keys group, computed result indication controlling means for controlling the display so as to display the computed results of the computing means on a predetermined region of the display. With the arrangement, a predetermined computing is carried out by the computing means based on the entered data through the entering keys and function keys group. The computed result indication controlling means controls the display so as to indicate the computed results.

The electronic measuring apparatus is preferably provided with a tracing base having a light source under the display, the display being a placing base of the measuring object. In that case, the electronic measuring apparatus has a function of the tracing base, i.e., a function of copying of a figure into another paper for example, in addition to the function of the electronic measuring apparatus itself, since the apparatus has the tracing base having the light source under the display. When the cursor or the entered graphic data on the display, even though the sheet on which the measuring object is drawn is placed on the display, the lightening of the light source permits the operator to recognize the graphic or cursor on the display through the sheet, thereby confirming whether or not the data of the measuring object are correctly entered.

It is another object of the present invention to provide an electronic measuring apparatus which can measure an angle between two straight lines not parallel with ease, accuracy, and high speed.

In order to achieve the foregoing object, the present electronic measuring apparatus is arranged such that when two straight lines not parallel with each other is specified within the plane entering means, the angle between the two straight lines is calculated according to the coordinate data of the two straight lines.

With the arrangement, when the two straight lines not parallel with each other is specified within the plane entering means, the graphic data generating means generates the coordinate data corresponding to the specified points, the specified points being on the two straight lines. The calculating means calculates the angle between the two lines. The calculated angle by the calculating means is displayed.

The electronic measuring apparatus preferably further comprises angle indication instructing means for instructing which one of the maximum angle and minimum angle which are made by the two straight lines should be displayed by the display means, wherein the calculating means calculates the angle to be displayed based on the instructions. With the arrangement, when the calculating means receives from the angle indication instructing means the instruction which angle, i.e., the maximum or minimum angle, should be displayed, it calculates the instructed angle made by the two straight lines. The calculated angle is displayed by the display means.

The electronic measuring apparatus preferably further comprises angle unit conversion entering means for entering specific angle unit conversion data, wherein the calculating means carries out the unit conversion of the calculated angle according to the specific angle unit conversion data. With the arrangement, the unit conversion of the calculated angle is carried out according to the specific angle unit conversion data, thereafter the display means displays the unit converted angle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention:

FIG. 5 is a plan view showing a straight line which is one of the measuring objects of the electronic measuring apparatus;

DESCRIPTION OF THE EMBODIMENTS

The following description deals with one preferred embodiment of the present invention with reference to FIGS. 1 through 15.

Figure 1:
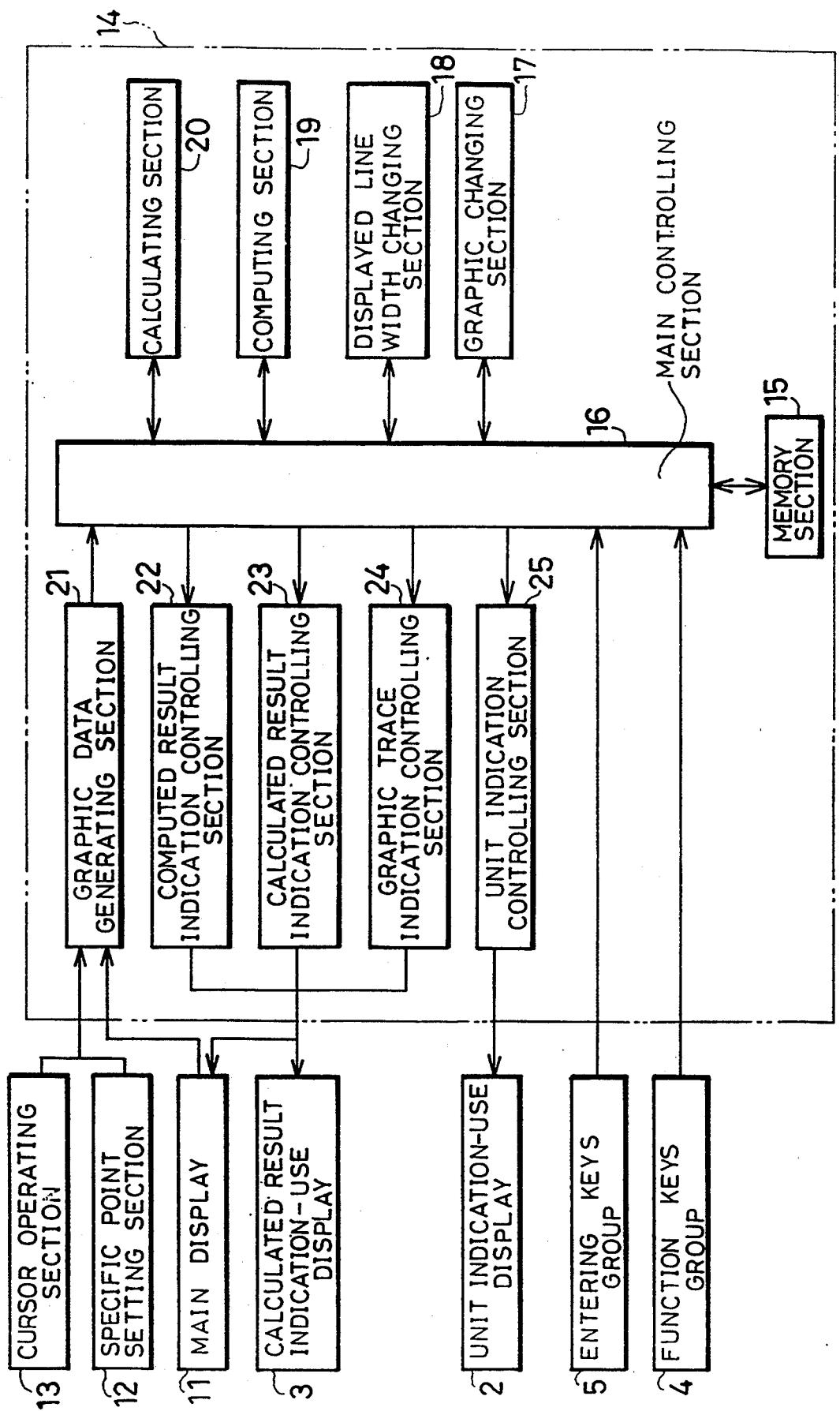
FIG. 1 is a block diagram showing the main structure of an electronic measuring apparatus of an embodiment in accordance with the present invention.
Figure 2:
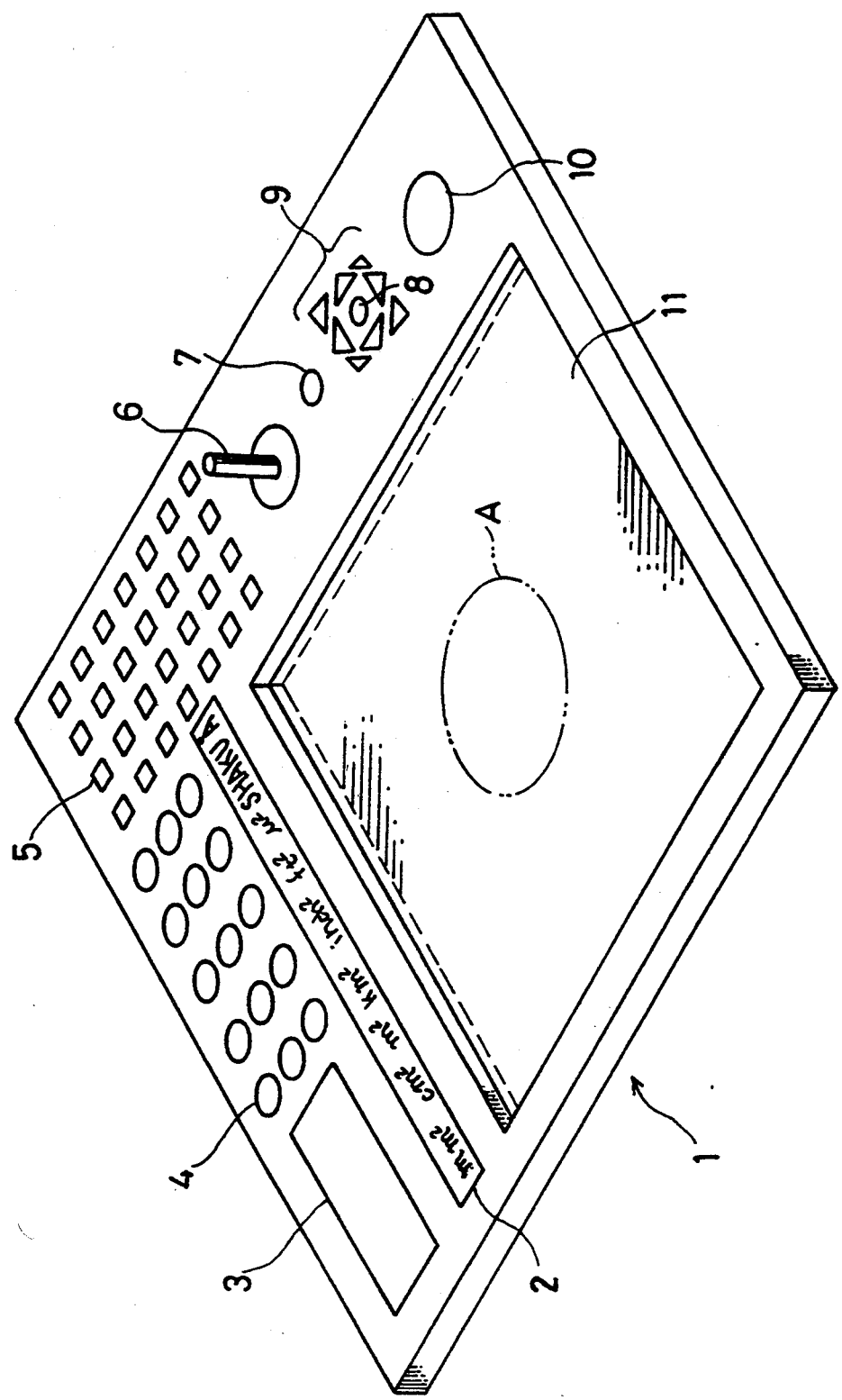
FIG. 2 is a perspective illustration showing an outline of the electronic measuring apparatus.

An electronic measuring apparatus 1 in accordance with the present embodiment, as shown in FIGS. 1 and 2, a main display 11 (display means) including a dot matrix liquid crystal display having a touch sensor (plane entering means), a calculated result indication-use display 3 (display means), a unit indication-use display 2, a cursor operating section 13 (cursor operating means) including a joy stick 6, a cursor key 9, a track ball 10 (these elements are later described) and other elements, a specific point setting section 12 including (specific point setting means) including the elements such as a continuous entering mode shift key 7 and a point entering key 8 (these elements are later described), a function keys group 4 (unit conversion entering means, angle unit conversion entering means, and angle indication instructing means) for entering specific data relating to such as unit conversion, an entering keys group 5 including a ten-key (scale factor conversion entering means) for entering specific data relating to such as scale factor conversion, and a control device 14 including a microcomputer composed of a RAM (Random Access Memory), a ROM (Read Only Memory), a CPU (Central Processing Unit), and other elements.

It is not necessary that the present embodiment includes all the above-mentioned structural elements. More specifically, for example, the cursor operating means may be composed of only the joy stick 6 without the cursor key 9 and the track ball 10 for the purpose of the reduction of the manufacturing cost.

The control device 14 has (1) a graphic data generating section 21 for generating coordinate data varying depending on a point which is specified in the main display 11, (2) a calculating section 20 (calculating means) for calculating a length, regional area and other item of the measuring object in accordance with the coordinate data, and for carrying out unit conversion and scale factor conversion, (3) a computing section 19 (computing means) for carrying out a variety of computing in accordance with the entered data by the entering keys group 5, (4) a displayed line width changing section 18 (displayed line width changing means) for changing the line width of a graphic curve on the main display or other display when the changing is required, (5) a graphic changing section 17 for deleting a graphic which is once entered and displayed, and for re-displaying the deleted graphic.

The control device 14 further includes (6) a computed result indication controlling section 22 (computed result indication controlling means) for controlling the main display 11 and calculated result indication-use display 3 so as to indicate the computed results of the computing section 19, (7) a calculated result indication controlling section 23 (calculated result indication controlling means) for controlling the main display 11 and calculated result indication-use display 3 so as to indicate the calculated results of the calculating section 20, (8) a graphic trace indication controlling section 24 (graphic trace indication controlling means) for controlling the main display 11 and calculated result indication-use display 3 so as to indicate a graphic defined by connecting the specified points on the main display 11, and (9) a unit indication controlling section 25 for controlling the unit indication-use display 2 so as to serially indicate the specified unit of the function keys group 4.

A main controlling section 16 controls the respective controlling sections, computing section, calculating section, and other sections. A memory section 15 is further connected to the main controlling section 16.

As shown in FIG. 2, the electronic measuring apparatus 1 has a shape of substantially plate and the outline thereof has the dimensions of, for example, 15 cm width, 17 cm depth, and 1 cm thickness. The outline thereof may have the dimensions of 25 cm width, 28 cm depth, and 2 cm thickness. The electronic measuring apparatus 1 is not restricted to the above-mentioned dimensions, i.e., the dimensions of the outline are preferably designed in accordance with the size of the measuring object.

Figure 3:
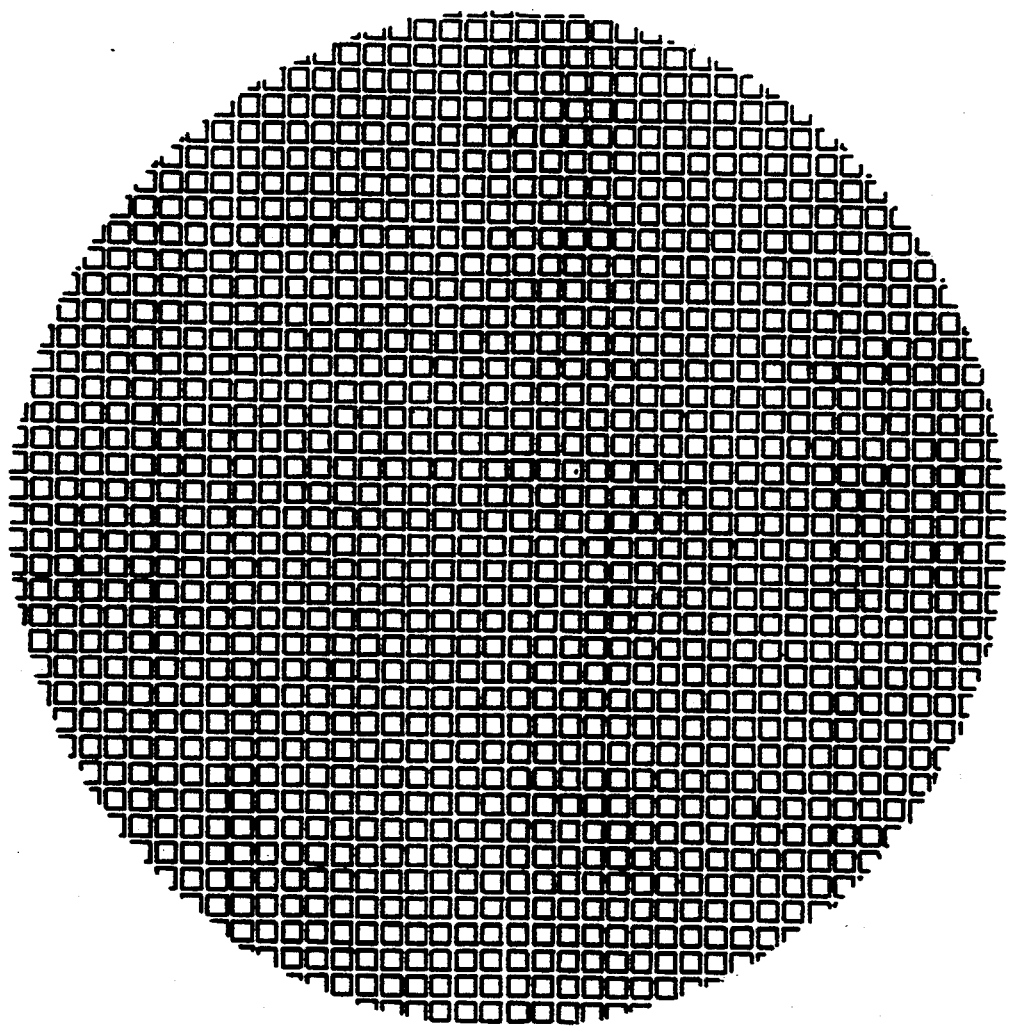
FIG. 3 an enlarged detail of the main portion of a main display of the electronic measuring apparatus.

The main display 11 is provided in the vicinity of a bottom surface of the electronic measuring apparatus 1. The main display 11 is composed of a dot matrix liquid crystal display having a touch sensor, the liquid crystal display being similar to that used in an electronic notebook such as "PA-9500" and "PA-9550" which are both of SHARP KABUSHIKI KAISHA's products. The main display 11 can be composed of a liquid crystal display similar to that used as a scope in a word processor of SHARP KABUSHIKI KAISHA's product, "pen shoin" (product type number of WV-S200) for example, of direct pen operation system type. When the similar kind of scope of the "pen shoin" is adopted, an exclusive pen (not shown) is attached. The dot matrix of the main display 11, as shown in FIG. 3, is regularly arranged such that the respective dots keep a predetermined pitch therebetween. Note that FIG. 3 is an enlarged detail of a region A indicated by the alternate long and two short dashes line of FIG. 2 in an arbitrary scale factor.

There are no restrictions to the size of each dot. However, the finer each dot is, with the higher accuracy the electronic measuring apparatus 1 can measure the measuring object and the entered dots, straight lines, curve, regions and the like can also be displayed, i.e., the operator can recognize them more easily. Accordingly, in ordinal, it is preferable to make each dot as fine as possible within the technical limit. It is also preferable to make the dot pitch as short as possible due to the similar reasons.

When the points corresponding to a graphic of the measuring object are specified through a touch stick or any kinds of sticks (both not shown), the touch stick being contained in the electronic notebook such as the "PA-9500" and "PA-9550" which are both of SHARP KABUSHIKI KAISHA's products, the graphic data generating section 21 generates the coordinate data corresponding to the specified points, and the graphic trace indication controlling section 24 controls the main display 11 and the calculated result indication-use display 3 so as to indicate a dot image pattern and a pattern having an arbitrary shape. The operator can freely select which display, i.e., the main display 11 or the calculated result indication-use display 3, should indicate them. The operator can also freely select whether both displays 11 and 3 should indicate them or neither the display 11 nor the display 3 should indicate them.

The calculated result indication controlling section 23 and computed result indication controlling section 22 control the main display 11 and the calculated result indication-use display 3 so as to indicate the length, the resultant regional area, unit conversion, and the resultant scale factor conversion which are calculated by the calculating section 20 on the predetermined region of the displays 11 and 3 and so as to indicate the halfway process, the computed results which are computed by the computing section 19, and character pattern such as messages on the predetermined area of the displays 11 and 3. Note that the main display 11 is in the transparent mode during specifying the points. After the specifying of the points, the main display 11 can be changed from the transparent mode to the nontransparent mode according to the request (see FIG. 1).

According to the present electronic measuring apparatus 1, desired graphic data can be entered through the cursor displayed on the main display 11. In order to do this, the electronic measuring apparatus 1 has, as shown in FIG. 2, on the right hand side thereof the cursor operating section 13, the specific point setting section 12 including the joy stick 6, the continuous entering mode shift key 7, the point entering key 8, the cursor key 9, and the track ball 10 in that order.

There is provided with the entering keys group 5, in the upper portion of the joy stick 6, for entering the specific scale factor conversion data relating to the scale factor value and the contruction scale value of the measuring object on the figure or on the map. The entering keys group 5 is arranged such that the ten-key, alphabet keys, keys for scientific technical calculation such as logarithm, exponent, sine, cosine, square root, and percentage are disposed like a portable electronic calculator or like an electronic notebook. The keys have the functions of those of the portable electronic calculator or electronic notebook.

The function keys group 4 for entering the specific unit conversion data, which are used for the conversion between the units of the length, or the regional area, is provided in the left side of the entering keys group 5. For example, the function keys group 4 are composed of exclusive unit conversion keys such as a key for converting from milimeter (mm) to inch (inch) or vice versa, a key for converting from inch (inch) to feet (ft) or vice versa, and a key for converting from feet (ft) to angstrom (Å) or vice versa.

When a desired unit conversion key of the function keys group 4 is keyed, the desired unit conversion is shown on the unit indication-use display 2.

Figures 4A, 4B, 4C:
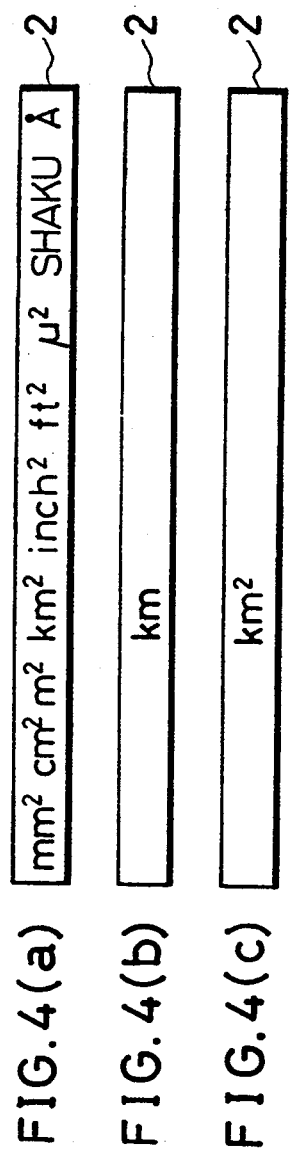
FIGS. 4(a) through 4(c) are plan views showing displayed examples of a unit indication-use display of the electronic measuring apparatus.

The unit indication-use display 2 is above the main display 11. The unit indication-use display 2 is controlled by the unit indication controlling section 25 so as to at least one kind of the length unit or the regional area unit of the measuring object, these units being preset by the function keys group 4. Note that FIG. 2 shows one example of the unit which is used during the measuring of the length of the straight line, curve, outer of the region, and the regional area. FIG. 2 shows, for convenience sake, the state where a plurality of units are simultaneously displayed. FIGS. 4(a), 4(b), and 4(c) show one example of the state where the unit indication-use display 2 actually displays. FIG. 4(a) is an elevational view of the unit indication-use display 2 when the electronic measuring apparatus 1 is seen from above, and shows like FIG. 2, for convenience sake, the state where a plurality of units are simultaneously displayed. FIG. 4(b) shows one example of the state where the measured respective lengths of the straight line, curve, and the outer of the region on the map for example is determined to indicate in the unit of "km" and is thus indicated as such. FIG. 4(c) shows one example of the state where the measured regional area of a predetermined closed-loop on the map for example is determined to indicate in the unit of "km$^2$" and is thus indicated as such. More specifically, the displayed portion of the unit indication-use display 2 where the unit "km" is shown coincides with that where the unit "km$^2$" is shown. The unit "km" and "km$^2$" are shown in the same portion of the display 2.

The calculated result indication-use display 3 is further provided still above the unit indication-use display 2 and is controlled by the calculated result indication controlling section 23 so as to display the calculated result of the calculating section 20 such as the length of the measuring object and calculated regional area are displayed like the main display 11. Note that the calculated result indication-use display 3 displays the dot image pattern earlier mentioned, the character pattern and the like in the similar manner where the main display 11 displays by the control of computed result indication controlling section 22, the calculated result indication controlling section 23, and the graphic trace indication controlling section 24.

Note that the unit indication-use display 2 and the calculated result indication-use display 3 are made of the display such as a liquid crystal display, an EL (Electro-Luminescense) display, and a plasma display.

The present embodiment deals with the case where the unit indication-use display 2 and the calculated result indication-use display 3 are separately provided. However, the present invention is not restricted to this, the two displays 2 and 3 may share one display.

Further note that the main body of the electronic measuring apparatus 1 contains therein a power source for supplying the power with respect to the above-mentioned structural elements. The power source (not shown) may be the dry battery and the solar battery. However, the present invention is not restricted to the integral battery, an externally supplied power source may be adopted as the battery. Both externally and internally supplied power source may be adopted as the battery.

The following deals with how to measure a straight line 26 like FIG. 5 on a map which is drawn in an equal scale, in a minification, or in a magnification by the use of the electronic measuring apparatus 1.

First, the electronic measuring apparatus 1 is placed on the map such that the straight line 26 is within the main display 11. Note that at this time, the straight line 26 can be transparently seen since the main display 11 is set to be in the transparent mode.

When an arbitrary stick member such as the touch stick earlier mentioned presses a point P1 which is an end of the straight line 26 through the main display 11, the point P1 is specified as a specific point. The graphic data generating section 21 generates coordinate data corresponding to the point P1, i.e., identifies an absolute position of a dot, corresponding to the point P1, of all the dots as the coordinate data. At this time, the dot corresponding to the point P1 on the main display 11 is displayed.

Figure 6:
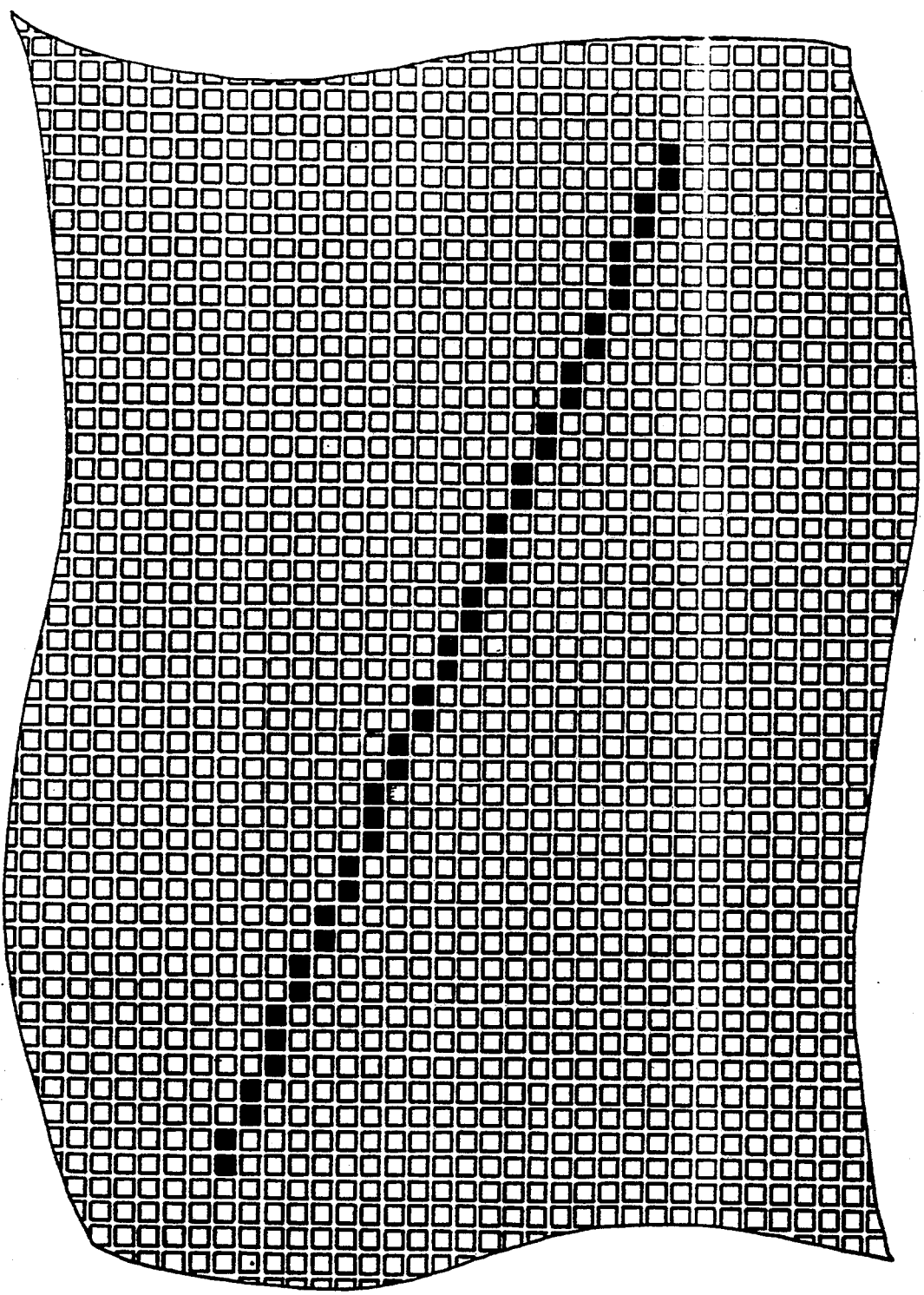
FIG. 6 is a plan view showing the state where the straight line are displayed by the main display of the electronic measuring apparatus.

Next, when the other end point P2 is pressed by the touch stick or other member in the similar manner to the case of the point P1, the position of the point P2 is set as a specific point. The graphic data generating section 21 generates coordinate data corresponding to the point P2 and the dot corresponding to the point P2 is displayed. The graphic trace indication controlling section 24 controls the main display so as to display, as shown in FIG. 6, all the dots corresponding to the points on the straight line connecting the points P1 and P2 upon finishing the entering of the point P2.

There is another way to specify the points on the main display 11 instead of using the main display 11 made of the dot matrix liquid crystal display having a touch sensor and the touch stick. More specifically, the points can be entered as the specific points by use of the cursor displayed on the main display 11. In the case, the operating state of the controlling device 14 is similar to that of the dot matrix liquid crystal display having the touch sensor. So, the detail explanation is omitted here.

First, the cursor on the main display 11 is moved by the use of the cursor key 9 of FIG. 2. When the cursor coincides with the point P1 on the straight line 26, the point entering key 8 is keyed, thereby setting the point P1 as a specific point. Thus, the dot on the main display 11 which corresponds to the point P1 is displayed. After the cursor is similarly moved to the point P2 by the use of the cursor key 9 such that the cursor coincides with the point P2, the point entering key 8 is keyed, thereby setting the point P2 as a specific point. Thus, the dot on the main display 11 which corresponds to the point P2 is displayed and the dots on the straight line connecting the points P1 and P2 are also displayed.

When the continuous entering mode shift key 7 is used, it can be simultaneously carried out that the cursor is moved by the cursor key 9 and the coordinate data corresponding to the trace which the cursor has moved are entered. More specifically, after the cursor is moved to the point P1 of the straight line 26, the continuous entering mode shift key 7 is keyed. And when the cursor is moved to the point P2 such that the cursor coincides with the point P2, the continuous entering mode shift key 7 is again keyed. According to this way, it can be simultaneously carried out that the coordinate data are entered by having the cursor moved and the main display 11 displays the trace which the cursor has moved.

In the case where the electronic measuring apparatus 1 has a continuous entering-use cursor key (not shown), in addition to the cursor key 9, which is usually set to be in the continuous entering mode, a desired graphic data can be entered provided that the continuous entering-use cursor key is used only when the cursor is moved on the figure to be entered and the cursor key 9, which is in the ordinary mode, is used for the cursor moving with respect to other region than the figure. More specifically, in case of the straight line 26, the cursor is moved up to the point P1 by the cursor key 9 while the cursor is moved from the point P1 to the point P2 by the continuous entering-use cursor key. The cursor key 9 is again used when the cursor is moved from the point P2 to other position than the straight line 26.

Still another way of moving the cursor is to use the joy stick 6, the track ball 10, or other device. In such cases, like the case of the cursor key 9, it is possible to enter the graphic data by the use of either the point entering key 6 or the continuous entering mode shift key 7.

When the electronic measuring apparatus 1 is provided with connecting terminals for connecting the external devices as a variety of options, an external entering device (external entering means) such as a mouse or a tablet can be used. In such cases, it is not necessary to place the electronic measuring apparatus 1 on the figure. Accordingly, it is not always required that the main display 11 be the dot matrix liquid crystal display having a touch sensor mentioned earlier. More specifically, the EL (Electro-Luminescense) display which is always in the nontransparent mode, and the plasma display, fluorescent display tube type display, and other displays may be used as the main display 11.

Note that the main display 11, joy stick 6, the continuous entering mode shift key 7, the point entering key 6, the cursor key 9, the track ball 10, and the external entering device, which are used as the entering means for entering the graphic data, alone or in combination can be used. Namely, such elements are timely selected according to the respective shapes of the measuring objects. A variety of entering means are provided with the electronic measuring apparatus 1 in accordance with the present embodiment, thereby enabling to measure a wide range of measuring objects. However, it is possible to omit unnecessary entering means and to have only necessary entering means according to the usage purpose of the electronic measuring apparatus so as to reduce the required manufacturing cost.

When the straight line 26 is entered in the above-mentioned manner, the length L of the straight line 26 is calculated by the calculating section 20 based on the following equation (1) provided that the coordinate of the point P1 is (X1, Y1) and the coordinate of the point P2 is (X2, Y2):

$$L=[(X2-X1)^2+(Y2-Y1)^2]^{\frac{1}{2}} \quad (1)$$

The calculated result indication controlling section 23 controls the main display and the calculated result indication-use display 3 so as to display the calculated results in the above-mentioned manner.

In the case where the figure is enlargedly or reducedly drawn, when specific scale factor conversion data such as the desired scale factor or the desired contraction scale are entered through the entering keys group 5, the calculating section 20 carries out the predetermined scale factor conversion, wherein the scale factor or contraction factor is corrected, so as to calculate the accurate length of the straight line 26, i.e., the distance between the points P1 and P2. The calculated result indication controlling section 23 controls the main display 11 and the calculated result indication-use display 3 so as to display thus calculated results respectively.

At this time, the unit indication-use display 2 shows the preset unit. When the specific unit conversion data are entered by keying the timely selected function key from the function keys group 4, the calculating section 20 carries out the desired unit conversion. The calculated result indication controlling section 23 controls the main display 11 and the calculated result indication-use display 3 so as to display the unit converted calculated results. The unit indication controlling section 25 controls the unit indication-use display 2 so as to show the converted unit.

In the case where the operator later finds that the scale factor and/or contraction scale is mistakenly entered or in the case where it is required to correct the entered scale factor and/or contraction scale for some reasons, when a new desired scale factor and/or contraction scale is reentered through the entering keys group 5, the calculating section 20 carries out again the predetermined calculations and the newly converted calculated results are shown again in the respective displays. Moreover, the similar corrections for the unit conversions can be carried out.

The function keys group 4 includes a cancelling key for entering the specific deleting region data and a re-displaying key for entering the specific re-displaying data for re-displaying the once deleted dots. Accordingly, when the specific deleting region data are entered through the cancelling key and the entering keys group 5, the graphic changing section 17 can change the display states such that the dots displayed on the main display 11 alone or in group go backward or such that the cancelling operation is carried out once or more. When the specific re-display data are entered through tile re-display key and the entering keys group 5, the graphic changing section 17 can re-display them again and again since the cancelled dots by the cancelling key are serially stored.

The function keys group 4 includes line width changing keys for changing a displayed line of the graphic on the main display 11. In the case where the displayed line is too fine to recognize since the graphic such as the straight line displayed on the main display 11 is composed of a chain of each dot (hereinafter each dot is referred to as a basic dot), or in the case where it is required to broaden the displayed line (or vice versa) for some reasons, when the specific width dimension data are entered through the line width changing keys and the entering keys group 5, dots adjacent to the corresponding basic dot as well as the basic dot can be also simultaneously displayed as those constituting the straight line or a plurality of consecutive dots adjacent to the corresponding basic dot can be also simultaneously displayed as those constituting the straight line.

Figure 7:
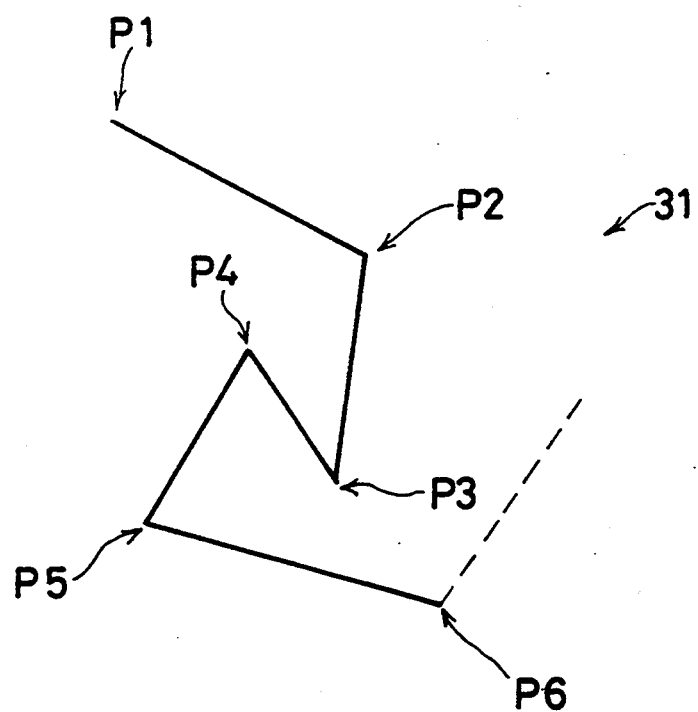
FIG. 7 is a plan view showing a continuous line segments group which is one of the measuring objects of the electronic measuring apparatus.

According to the present embodiment, it is possible to measure not only the length of the one straight line of FIG. 5 but also the length of a continuous line segments group 31 of a plurality of line segments such as P1-P2, P2-P3, P3-P4, P4-P5, P5-P6 of FIG. 7, the respective line segments being connected with the edges thereof one another. In such case, the points P1, P2, P3, P4, P5, P6, . . . in this order are entered as the specific points and simultaneously each line segment is displayed on the main display 11. After entering of the continuous line segments group 31, (1) the sum of the lengths of all the line segments, (2) the length of only the n-th line segment of the entered line segments, (3) the length of the plural line segments of continuous or noncontinuous, the first line segment, the m-th line segment, the n-th line segment, and other line segments can be calculated and the respective calculated results can be displayed.

The operator can freely specify which line segments (such as the first, the m-th, the n-th line segment) should be summed up. The following is the way of specifying the line segments to be summed up for example: (1) after each line segment of the entered continuous line segments group is flashed on and off one by one in the predetermined order, the desired line segment(s) is(are) specified as the desired line segment(s) by the function keys group 4 and the entering keys group 5; or (2) each central portion of the desired line segments P1, P2, P3, P4, P5, P6, . . . is touched by the touch stick for example (a portion on each segment line and the vicinity of each line segment can be touched instead of the central portion of each line segment), thereby only the touched line segment(s) is(are) specified as the desired line segment (s).

Figure 8:
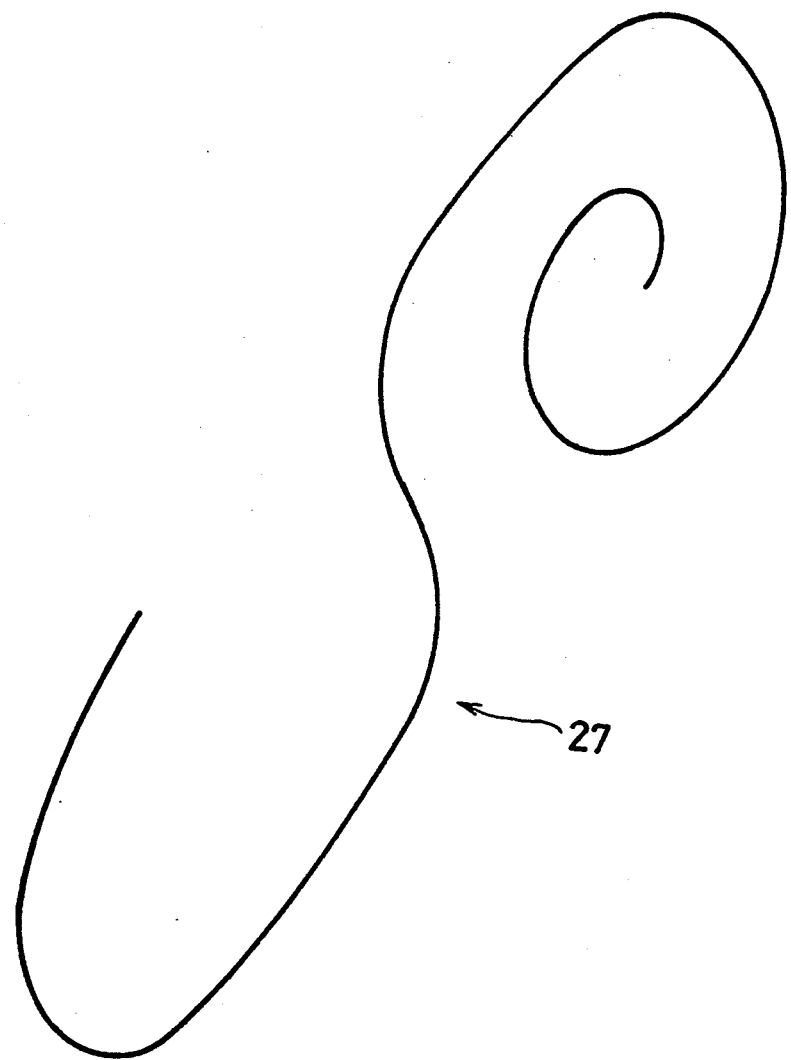
FIG. 8 is a plan view showing a curve which is one of measuring objects of the electronic measuring apparatus.
Figure 9:
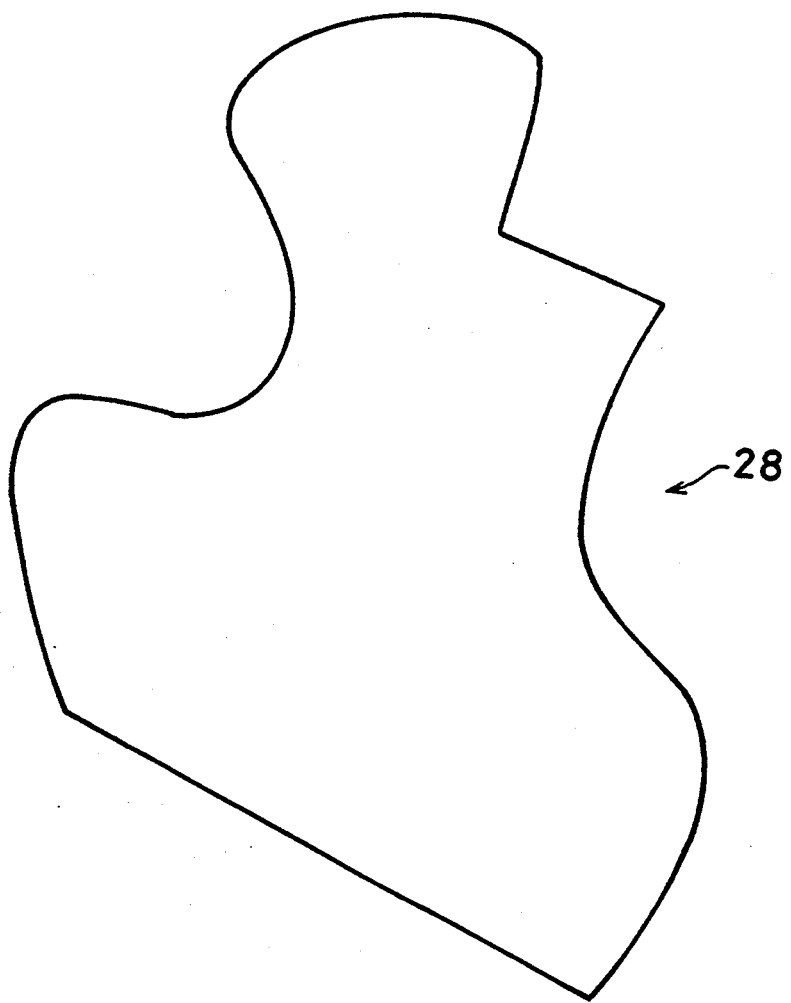
FIG. 9 is a plan view showing a curve of closed-loop which is one of measuring objects of the electronic measuring apparatus.
Figure 10:
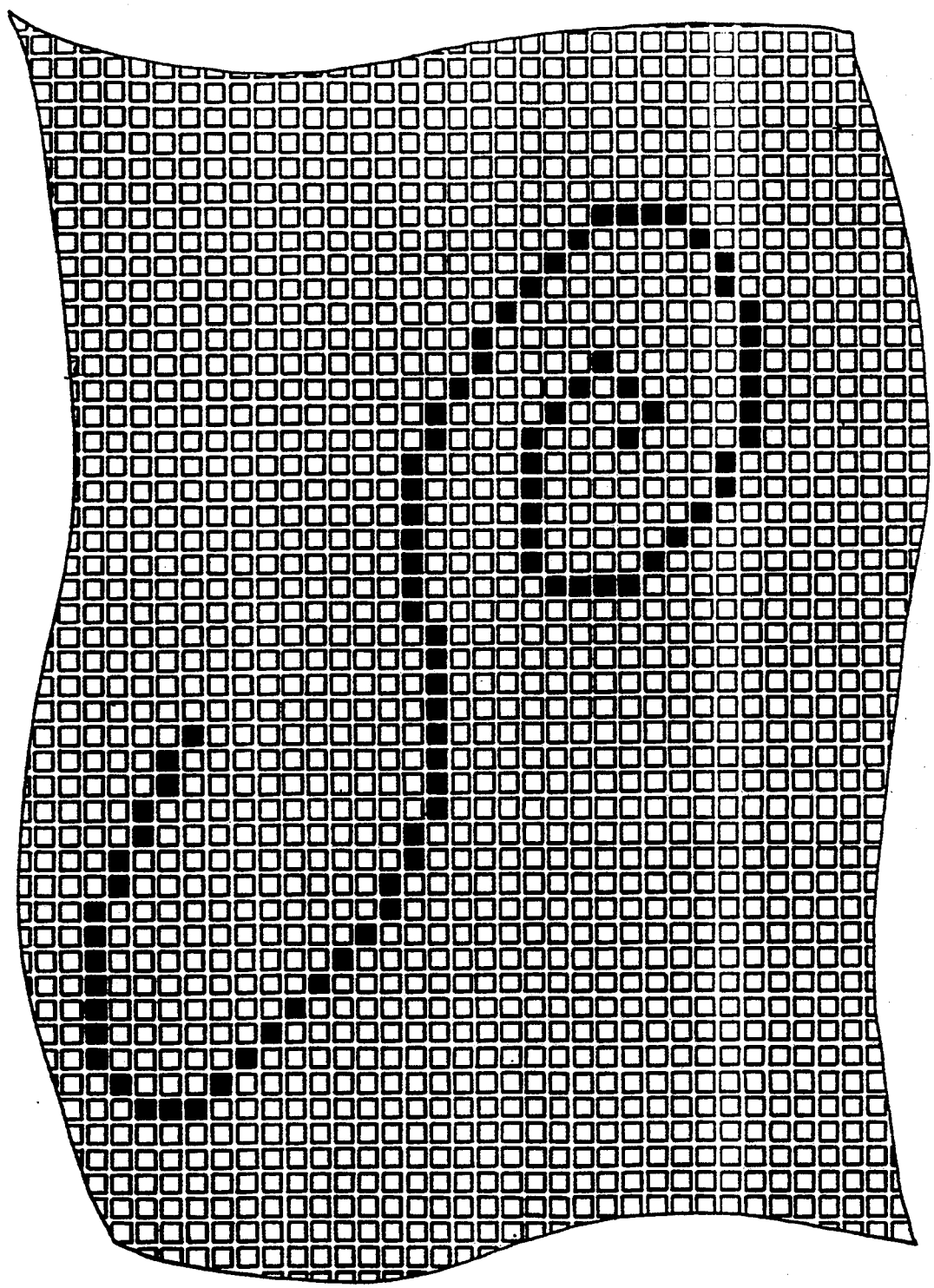
FIG. 10 is a plan view showing the state where the curve of FIG. 8 is displayed by the main display.
Figure 11:
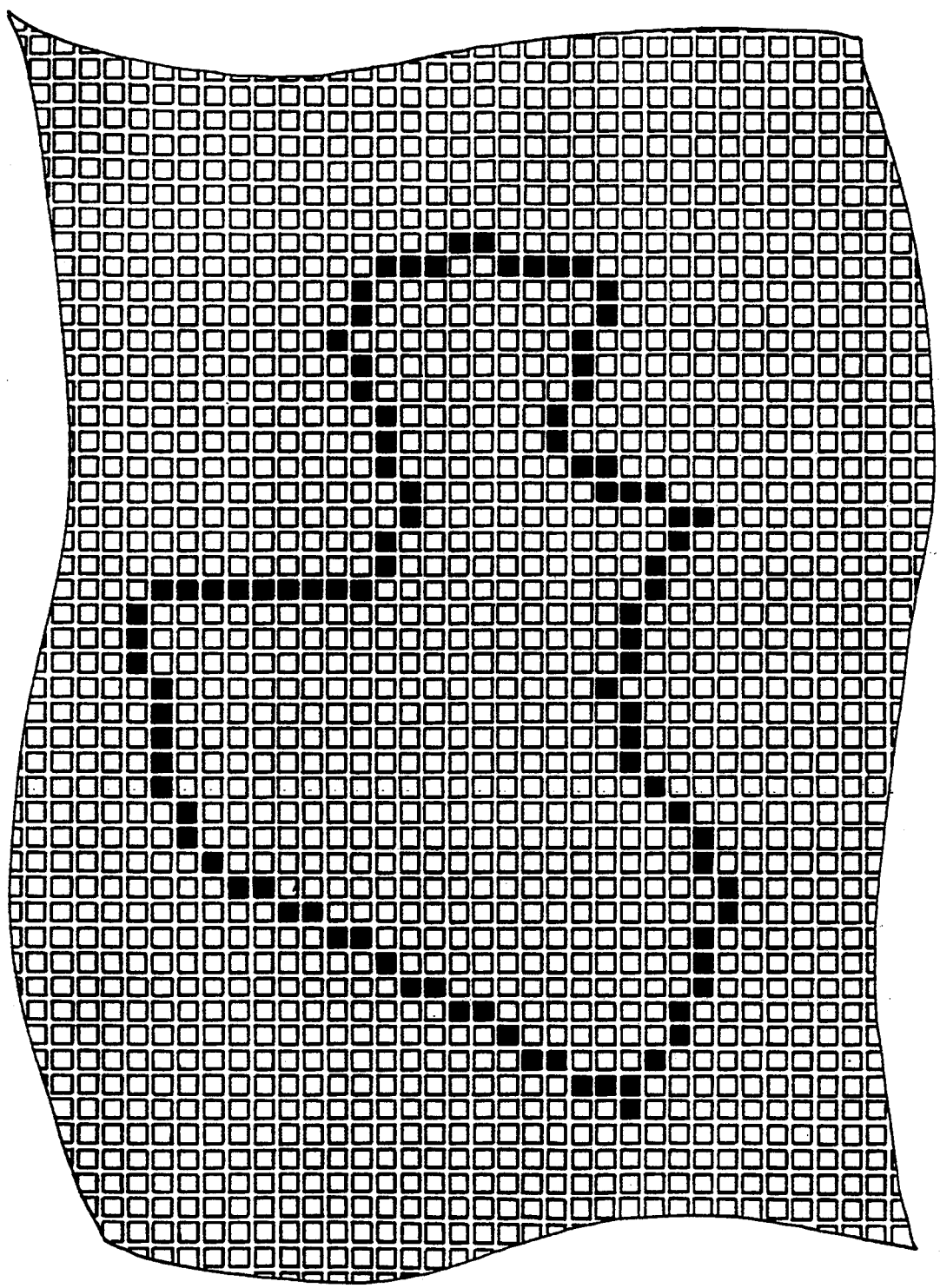
FIG. 11 is a plan view showing the state where the curve of FIG. 9 is displayed by the main display.

The following deals with the measuring of the length of a curve 27 of FIG. 8 and the length of a closed-loop curve 28 of FIG. 9, FIGS. 8 and 9 showing the equal scale, the enlarged, or reduced drawings. Note that the measuring is in the similar manner to that of the length of the straight line except for the entering of the curve and the calculating of the length.

As mentioned above, when the straight line is measured, the two points corresponding to both ends are entered as the specific points, thereby finishing the entering of the graphic data and thereby enabling to obtain the length thereof. In contrast, when the curve is measured, it is required that all the points on the curve should be entered as the specific points.

Accordingly, when the graphic data are entered with respect to the curve 27 (see FIG. 8) or the closed-loop curve 28 (see FIG. 9) for example, the electronic measuring apparatus 1 is placed on the drawing such that the curve 27 or closed-loop curve 28 is within the region of the main display 11 of the dot matrix liquid crystal display having a touch sensor which is set to the transparent mode. Thereafter, the operator traces on the curve 27 or closed-loop curve 28 with the touch stick or other member. With the curve entering, the specified points which are all on the curve 27 or the closed-loop curve 28 are entered into the graphic data generating section 21 as the coordinate data. Further, the graphic trace indication controlling section 24 controls the main display 11 so as to display the dots, like FIG. 10, corresponding to the curve 27 of FIG. 8, or so as to display the dots, like FIG. 11, corresponding to the closed-loop curve 28 of FIG. 9.

When the electronic measuring apparatus 1 adopts the external entering device such as a mouse having a pointer or a tablet mouse, the curve can be entered based on the fact that the operator traces on the curve of the measuring object with the mouse having a pointer after placing the mouse having a pointer on the drawing and can also be entered based on that the operator traces on the curve with the tablet mouse after placing the drawing on the tablet.

The calculating section 20 calculates the respective distances between the two neighboring dots in the similar manner to the case of the straight line and sums up all the calculated distances between the dots, thereby obtaining the whole length of the curve. In such case, it is also possible to carry out the conversions such as the scale factor conversion and the unit conversion according to the request, and each calculated result, the specified unit, and other items are shown, like the straight line case, on the respective predetermined regions of the main display 11, the calculated result indication-use display 3, and the unit indication-use display 2.

Note that when a circle is specified as the closed-loop curve, it is not necessary to enter all the points on the circle as the specific points. More specifically, when only arbitrary three points on the circle are specified, the central point of the circle is mathematically identified. The radius and diameter of the circle are calculated based on the central point and one specific point on the circumference of the circle. The circumference length is calculated based on the calculated radius and the regional area of the circle is also calculated based on the calculated radius. In such case, it is preferable to specify the three points so as to be located as far as possible with one another, thereby enabling to enter the circle with high accuracy and thereby achieving the high accurate measuring.

As mentioned above, according to the present apparatus, when the circle on the drawing is specified as the closed-loop curve, the radius, diameter, regional area, and circumference length of the circle can be easily and swiftly measured respectively with high accuracy. Further, when the radius, diameter, regional area, and circumference length of the circle on the drawing is measured, it is not necessary to place the drawing such that the whole circle is within the main display 11. More specifically, it is only necessary to place the drawing such that one part of circle is within the main display 11, thereby making the measuring operations easy and thereby remarkably improving the operability. Further, the burdening and fatigue which the operator has had with respect to the conventional scale can be remarkably reduced.

Figure 12:
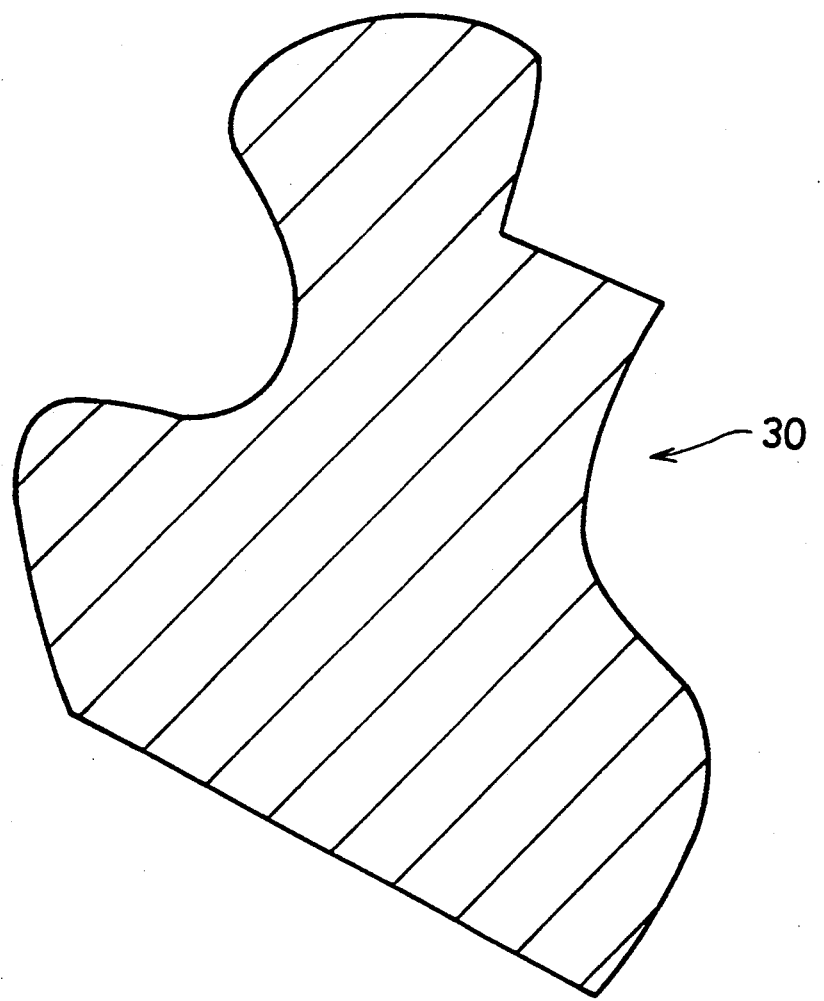
FIG. 12 is a plan view showing a region which is one of measuring objects of the electronic measuring apparatus.

The following deals with the way of measuring the regional area of a region 30 on a drawing as shown in FIG. 12, the drawing being drawn in the equal scale, in the reduced manner, or in the enlarged manner. Note that the measuring is in the similar manner to that of the length of the straight line except for the entering of the curve and the calculating of the regional area.

Figure 13:
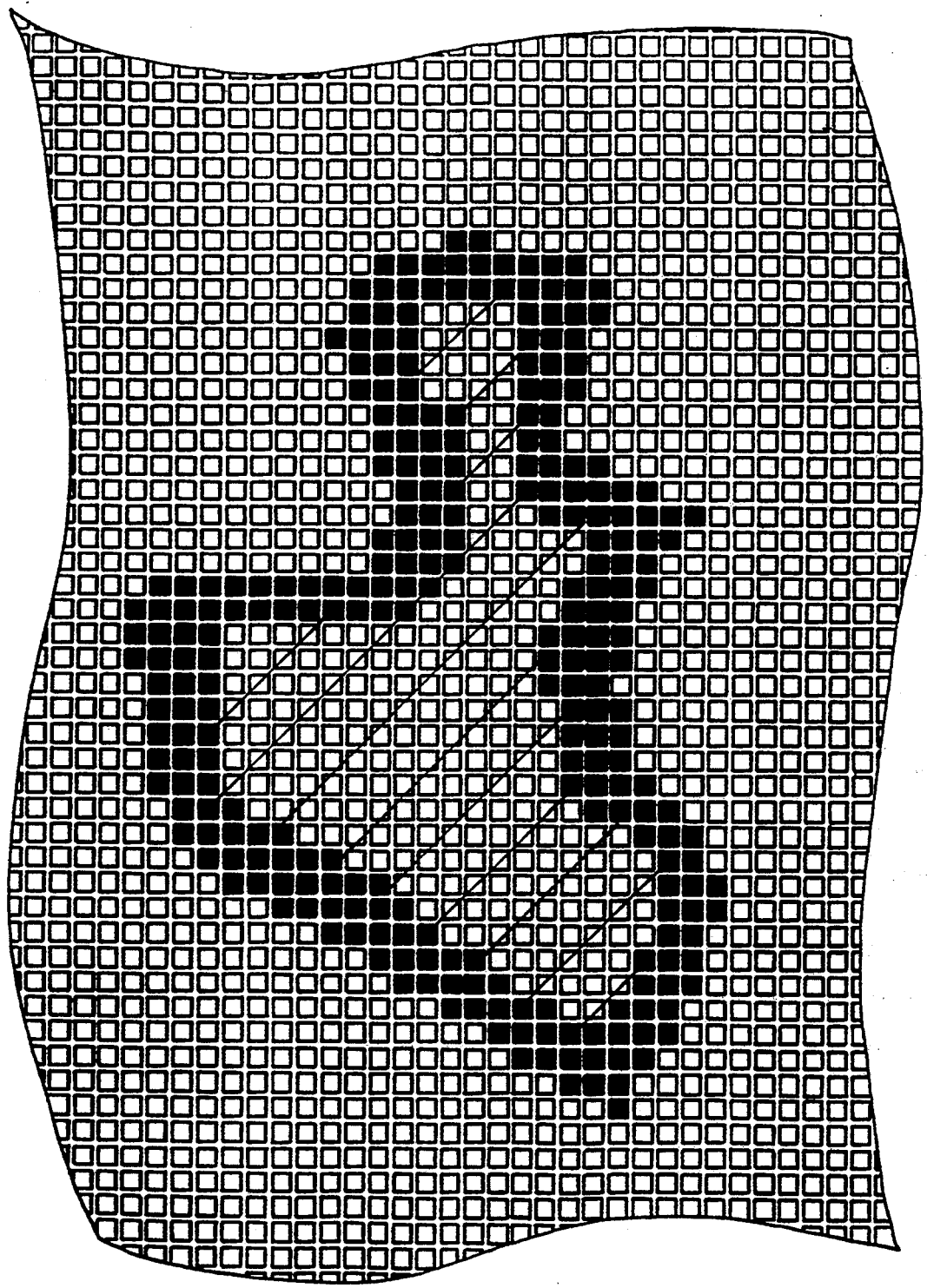
FIG. 13 is a plan view showing the state where the region is displayed by the main display.

First, like the case of the above-mentioned curve, the electronic measuring apparatus 1 is placed on the drawing such that the region 30 is within the main display 11 of the dot matrix liquid crystal display having a touch sensor. Thereafter, the operator traces on the circumference of the region 30 with the touch stick. And when one point within the region 30 is touched by the touch stick, all the dots corresponding to the region 30 of the main display 11 are displayed as shown in FIG. 13. Note that FIG. 13 omits the painting out of the dots inside the region, i.e., the dots inside the region is indicated as the slanting line. Note also that the region 30 may be entered by the use of the external entering devices such as a mouse and a tablet like the foregoing entering of the curve.

Figure 14:
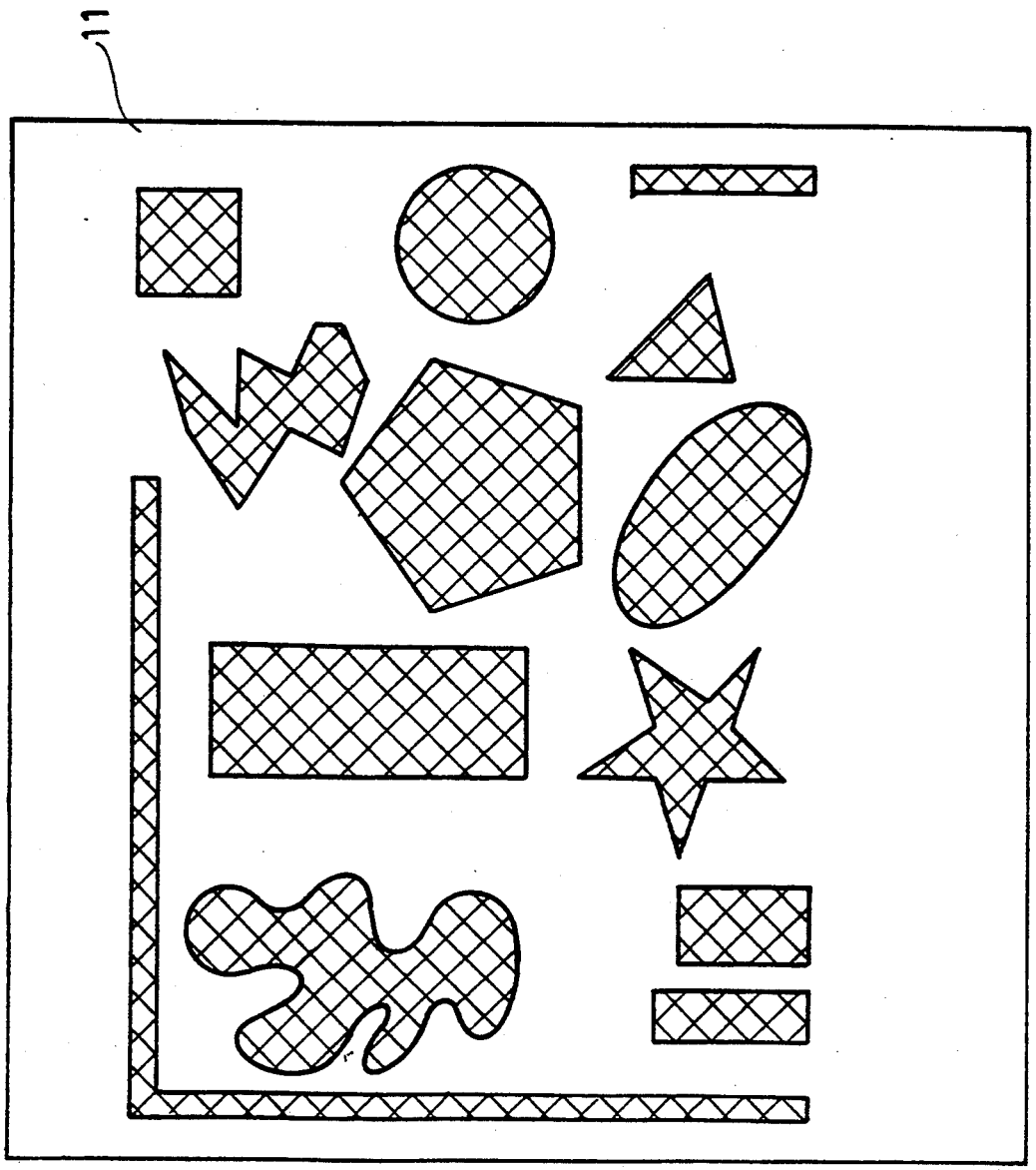
FIG. 14 is a plan view showing the state where a plurality of regions are displayed by the main display.

With the arrangement, the calculating section 20 calculates the number of the displayed dots, thereby obtaining the regional area of the region 30 based on the calculated number of dots. Even in such case, the unit conversion and scale factor conversion can be made according to the request. The respective results of the calculations, scale factor conversions, unit conversions, and the specified unit or other items are displayed, like the measuring of the straight line, in the respective predetermined portions of the main display 11, the calculated result indication-use display 3, and the unit indication-use display 2. The following is also possible: a plurality of regions can be simultaneously entered such that the main display 11 displays the regions and shows (1) the respective regional areas, (2) the total regional area of all the entered regions, or (3) the total regional area of the some specified regions of all the entered regions are calculated, and the resultants are displayed. For example, FIG. 14 shows the example of the entering and the displaying of the plurality of regions. Note that FIG. 14 only shows the main display 11 of the electronic measuring apparatus 1, i.e., the others are omitted. In FIG. 14, the meshed region shows the region to which the regional area is required to be calculated, the region coinciding with the entered one and being displayed on the main display 11.

As mentioned above, the electronic measuring apparatus 1 of the present embodiment adopts (1) the dot matrix liquid crystal display having a touch sensor, (2) the cursor operating section and specific point setting section such as the cursor key, and (3) the external entering device such as the mouse, thereby enabling to enter any kinds of graphics such as the straight line and the curve, and thereby enabling that the lengths of the respective graphics and the regional areas thereof are calculated. Accordingly, it is possible to accurately and swiftly obtain the regional area, the length, or other measuring object of the region having the complicated shape, though these measuring objects could not measured with accuracy and high speed according to the conventional scale.

It is possible to carry out the scale factor conversion only by entering the desired scale factor through the entering keys group 5. It is also possible to carry out the unit conversion only by specifying the desired unit through the function keys group 4. Accordingly, any kinds of lengths on the figure having arbitrary scale factors can be measured.

Further, the present electronic measuring apparatus 1 has the superior functions that it can change the line width of the figure on the main display 11 according to the request and can delete the displayed figure by every dot and can re-display the dots which has been once deleted, thereby enabling to easy-to-use.

Still further, the present electronic measuring apparatus 1 has the functions of the portable calculator and the electronic note. So, the desired scientific calculations can be carried out and the displayings of such as a variety of data, symbols, and patterns can be also carried out by the use of the entering keys group 4, the control device 14, the calculated result indication-use display 3, and other structural elements.

The foregoing embodiment deals with the example where the lengths of the straight line and the curve on the drawing and the regional area of the region on the drawing are measured. However, according to the electronic measuring apparatus of the present invention, the distance and the regional area on the map, and those of other measuring object can be measured and the scale factor conversions and the unit conversions for the measured results can be carried out respectively.

Further, the present embodiment deals with the electronic measuring apparatus of planer type, but the present invention is not restricted to this. More specifically, all the hardwears and softwears (functions) such as the main display 11 which constituting the electronic measuring apparatus can be incorporated into the tracing base.

In general, the tracing base has on its upper surface a thin panel of such as the translucent glass. A light source such as the fluorescent lamp is provided under the panel. The tracing base is used when a figure on the original sheet is copyed to another sheet for example. In such case, the original sheet is placed on the panel having the figure thereon and another sheet to be copyed is placed as to coincide with each other. Thereafter, the light source provided under the panel is turned on. Thus, since the light from the light source reaches the operator's eyes through the panel, the original sheet, and the sheet to be copyed, the operator can clearly recognize the figure on the original sheet through the sheet to be copyed so as to copy with ease the figure on the original sheet to the sheet to be copyed.

Figure 15:
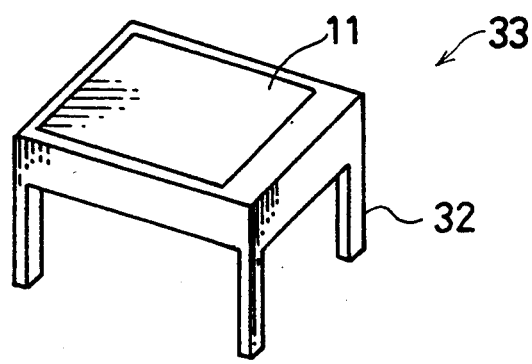
FIG. 15 is a perspective illustration showing an electronic measuring apparatus with a tracing base, the apparatus being incorporated into the tracing base.

FIG. 15 shows one example of an electronic measuring apparatus having a tracing base 33 wherein the electronic measuring apparatus 1 is incorporated into a tracing base 32. Note that FIG. 15 shows without a variety of keys and the joy stick. The main display 11 mentioned earlier is used for the panel which is provided on the upper surface of the tracing base 32, the main display 11 being a liquid crystal display made of such as a transparent glass. The outer dimension of the electronic measuring apparatus having a tracing base 33 are, for example, 120 cm wide, 70 cm high, and 80 cm thick.

The electronic measuring apparatus having a tracing base 33 is provided under the main display 11 with the light source (not shown) of a plurality of fluorescent lamps. Accordingly, in the case where the electronic measuring apparatus having a tracing base 33 is used as the ordinary tracing base, when the main display 11 is set to be in the transparent mode and the light source is lightened, the above-mentioned copying or other process can be carried out. The electronic measuring apparatus having a tracing base 33 is provided with a light amount adjuster (not shown). When the operator determines the lighting is not proper during the transparent mode of the main display 11, the operator adjusts the light amount adjuster such that the main display 11 can be changed into the intermediate mode between the transparent mode and the nontransparent mode, i.e., can be changed into the mode wherein only one part of the light from the light source are transmitted. The above-mentioned light amount adjuster makes it possible to add the light amount adjusting function which the conventional tracing base could not have.

The foregoing embodiment deals with the case where the electronic measuring apparatus 1 is placed on the sheet whereon the measuring object such as the graphic is drawn so as to directly enter the graphic data from the surface of the main display 11. However, the electronic measuring apparatus having a tracing base 33 is arranged such that the entering of the graphic data are carried out through the sheet on which the measuring object of the graphic is drawn by placing the sheet on the main display 11. More specifically, in order to measure the respective lengths, the total or partial regional area of the measuring object such as the graphic, it is necessary to enter the graphic data by pressing the specific points on the sheet, which is placed on the main display 11 and has the graphic, through the touch stick similar to the foregoing one.

Further, the electronic measuring apparatus having a tracing base 33 is arranged such that the main body having the main display 11 can be electrically and physically removable from the tracing base. Accordingly, when it is required that (1) the respective lengths of the figure which is drawn on the sheet having the size of 119 cm wide and 84 cm high for example, (2) the respective lengths of the straight line, the continuous line segments group, and the curve which are on the centerfold of the map book, (3) the regional area of the predetermined region and other measuring object on the centerfold of the map book, be measured, then the main body is electrically and physically removed from the electronic measuring apparatus having a tracing base 33, thereby enabling to use it so as to freely move like the foregoing case. Especially, in case of the map book, it is to thick. So, even though the map book is placed on the main display 11 of the electronic measuring apparatus attached to the tracing base, it is nearly impossible to enter the graphic data or it is possible to enter them with terrible difficulty and with bad operability. However, when the main body is removable from the tracing base like mentioned above, (1) the respective lengths of the figure which is drawn on the sheet having the large size, (2) the respective lengths of the straight line, the continuous line segments group, the curve on the centerfold of the map book, (3) the regional area of the predetermined region and other measuring object on the centerfold of the map book can be entered and measured with ease.

Further, with regard to the entering of the graphic data, the variety of ways mentioned earlier can be adopted. When the graphic data are entered by the use of the cursor displayed on the main display 11, the lightening of the light source provided under the main display 11 make it possible to easily recognize the cursor and to easily enter the graphic data, thereby causing the improvement in the operability.

When the light source is lightened during the displaying the entered graphic data on the main display 11, the entered straight line, curve, and region can be recognized through the sheet on which the measuring object is drawn. Thus, it can be confirmed whether or not the measuring object on the sheet coincides with the actually entered graphic, i.e., whether or not the entering has correctly carried out.

Moreover, the electronic measuring apparatus may be incorporated into an ordinary office desk, a wall inside the room of the building for example. When the electronic measuring apparatus is incorporated into the ordinary office desk, it is preferable to arrange such that the electronic measuring apparatus is removable from the ordinary office desk. When the electronic measuring apparatus is incorporated into the wall inside the room of the building, it is preferable to arrange the electronic measuring apparatus such that the main display is designed to have the outer dimension of 200 cm high and 200 cm wide for example and such that the electronic measuring apparatus has the same plane as the wall by modifying the wall inside the room of the building, i.e., such that the electronic measuring apparatus is not ejected from the wall. Accordingly, when the electronic measuring apparatus having this large size is kept in safe, the surplus space is not required, thereby giving any inconveniences to others.

When the electronic measuring apparatus is incorporated into the wall, the main display is kept vertically with respect to the ground. Thus, it is a little bit hard to use the apparatus as it is. However, when the length (the whole length of about 30 cm for example) of one part of the curve on the figure which is drawn on the sheet of 297 mm high and 210 mm wide is measured, the measuring is carried out in a short time, thereby presenting no problem of bad operability. In contrast, when the measuring is continuously carried out in a long period of time, it is preferable two operators to remove the electronic measuring apparatus from the wall and thereafter to horizontally place it into the ground so as to measure the measuring object.

The following deals with the case where the electronic measuring apparatus 1 measures an angle between two straight lines of not parallel each other with reference to FIGS. 16 through 19.

Figure 16:
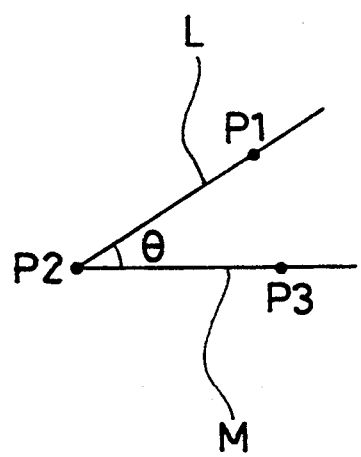
FIG. 16 is an explanatory diagram showing an example measuring an angle between two straight lines by the use of the electronic measuring apparatus.

The following deals with the case of FIG. 16 where one end of a straight line L connecting points P1 and P2 and one end of a straight line M connecting points P2 and P3 intersect each other at the point P2. It is assumed that the angle between the two lines L and M is $\theta$ (°). Note that it is assumed that the line M is horizontal. Note also that the further the points P1, P2 and P3 are specified one another, with the higher accuracy the straight line is specified. Accordingly, it is preferable to specify the straight line as further as possible one another in order to measure with high accuracy.

In such case, the electronic measuring apparatus 1 is placed on the drawing such that the portion corresponding to the angle to be measured of the straight line and peripheral portions thereof are appropriately located within the main display 11. During the placing, the main display 11 is set to be in the transparent mode such that the figure is transparently recognized through the main display 11.

Thereafter, the three points P1, P2 and P3 on the two straight lines L and M are entered by pressing them on the main display 11 through the arbitrary kinds of stick such as the touch stick mentioned earlier. Note that there is no restriction to the entering order of the three specific points.

The following deals with the case where the points P1, P2 and P3 are entered in this order. More specifically, when the point P1 on the straight line L is first entered, the graphic data generating section 21 generates an absolute position of a dot, corresponding to the point P1, of all the dots as the coordinate data. The dot corresponding to the point P1 is displayed on the main display 11. In the similar manner, the point P2 is specified next and the corresponding coordinate data is generated. Thereafter, the corresponding dot and the line segment of P1-P2 are displayed respectively on the main display 11. Note that the straight line L having no end can be displayed on the main display 11 instead of the line segment of P1-P2. This is done either by instructing the displaying of the line segment through the function keys group 4 or instructing the displaying of the straight line through the calculating section 20. In the similar manner, the point P3 is specified next and the corresponding coordinate data is generated. Thereafter, the corresponding dot and the line segment of P2-P3 (or the straight line M) are displayed respectively on the main display 11.

It is sometimes hard to recognize the specific point when the specific point is displayed by only one dot. In such case, the deficiency can be overcome by simultaneously displaying the peripheral dots along with the specified dot. The operator can set the desired number of peripheral dots to be simultaneously displayed along with the specified dot by the use of the function keys group 4 and the entering keys group 5. However, only the first specified point which was entered as the specific point is recognized as the unique specific point. Thus, only the coordinate data corresponding to the unique specific point is generated by the graphic data generating section 21. In other words, the graphic data generating section 21 does not generate the graphic data corresponding to the peripheral dots. Accordingly, the calculating section 20 calculates based only on the coordinate data corresponding to the specific point, thereby giving no affects on the accuracy of the variety of calculations.

For convenience sake, it is assumed that the surface plane of the main display 11 corresponds to the rectangular coordinates having x axis and y axis. Then the above-mentioned coordinate data are given by the respective coordinates of the three points P1, P2 and P3, i.e., (X1, Y1), (X2, Y2), and (X3, Y3). The following deals with the fact that the calculating section 20 automatically calculates the angle between the straight lines L and M based on the three coordinates with reference to FIG. 18. Note that FIG. 18 adopts the same reference numerals as FIG. 17 with respect to the corresponding specific point since FIG. 18 corresponds to FIG. 17.

More specifically, a perpendicular N (shown as the broken line) is plotted with respect to the straight line M from the point P1 as an auxiliary line. When it is assumed that the coordinate of the intersecting point P10 is (X10, Y10), the triangle P1P2P10 (hereinafter referred to as $\Delta$ P1P2P10) becomes a right angled triangle. In such case, the coordinate of the intersecting point P10 is given in accordance with the following manner.

The equation of the straight line L connecting the points P2 and P3 is given by the following equation (1):

$$y=(Y3-Y2)\cdot x/(X3-X2)+(Y2\cdot X3-Y3\cdot X2)/(X3-X2) \quad (1)$$

The gradient of the straight line L is $(Y3-Y2)/(X3-X2)$, so the gradient of the perpendicular N is $-(X3-X2)/(Y3-Y2)$. As the point P1 is on the perpendicular N, the equation of the perpendicular N is given by the following equation (2):

$$y=-(X3-X2)\cdot x/(Y3-Y2)+[(Y3-Y2)\cdot Y1+(X3-X2)\cdot X1]/(Y3-Y2) \quad (2)$$

where $X3 \neq X2$ and $Y3 \neq Y2$.

Accordingly, X10 and Y10 are given respectively based on the equations (1) and (2) by the following equation:

$$X10=[(X3-X2)\cdot(Y3-Y2)\cdot Y1+(X3-X2)^2 \cdot X1+(Y3-Y2)\cdot(Y3\cdot X2-Y2\cdot X3)]/[(Y3-Y2)^2+(X3-X2)^2]$$

$$Y10=[(Y3-Y2)\cdot Y1+(X3-X2)\cdot X1-(X3-X2)\cdot X10]/(Y3-Y2)$$

The lengths of the respective sides of $\Delta$P1P2P10 can be calculated based on the coordinate of the calculated intersecting point P10 and the respective coordinates of the specific points P1 and P2 by the use of the Pythagorean theorem. When it is assumed that the respective lengths of the side P1-P2 and the side P2-P10 are $l_{12}$ and $l_{210}$, the lengths $l_{12}$ and $l_{210}$ are given by the following equation:

$$l_{12}=[(X1-X2)^2+(Y1-Y2)^2]^{\frac{1}{2}}$$

$$l_{210}=[(X2-X10)^2+(Y2-Y10)^2]^{\frac{1}{2}}$$

Accordingly, based on the trigonometric function, $\cos \theta = l_{210}/l_{12}$, so $\theta$ can be given by $\theta=\cos^{-1}(l_{210}/l_{12})$ in accordance with the inverse trigonometric functions. Thus, the angle $\theta$ is automatically calculated by the calculating section and thereafter the calculated results are shown on the respective predetermined region of the main display 11 and the calculated result indication-use display 3.

Figure 17:
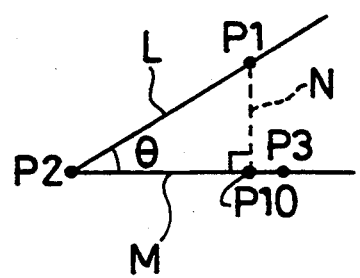
FIG. 17 is an explanatory diagram showing the detail of the measuring of the angle between the two straight lines of FIG. 16.

When X3=X2 and Y3=Y2 are satisfied, the straight line M of FIG. 17 is parallel with respect to the x axis. So, the intersecting point P10 is given by (X1, Y2) since X10=X1 and Y10=Y2 are satisfied. Accordingly, $\theta$ can be given like the case of $X3 \neq X2$ and $Y3 \neq Y2$.

The following deals with another way of obtaining $\theta$ instead of the above-mentioned way. More specifically, when the three points P1, P2 and P3 are specified in the above-mentioned manner, the lengths $l_{12}$, $l_{23}$ and $l_{31}$ of the respective sides P1-P2, P2-P3 and P3-P1 are given by the following equations:

$$l_{12}=[(X1-X2)^2+(Y1-Y2)^2]^{\frac{1}{2}}$$

$$l_{23}=[(X2-X3)^2+(Y2-Y3)^2]^{\frac{1}{2}}$$

$$l_{31}=[(X3-X1)^2+(Y3-Y1)^2]^{\frac{1}{2}}$$

Accordingly, the law of cosines satisfies the following equation:

$$\cos \theta = [(l_{12})^2+(l_{23})^2-(l_{31})^2]/2\cdot(l_{12}\cdot l_{23})$$

So, the inverse trigonometric functions satisfy the following equation:

$$\theta = \cos^{-1}[[(l_{12})^2+(l_{23})^2-(l_{31})^2]/2\cdot(l_{12}\cdot l_{23})]$$

Figure 18:
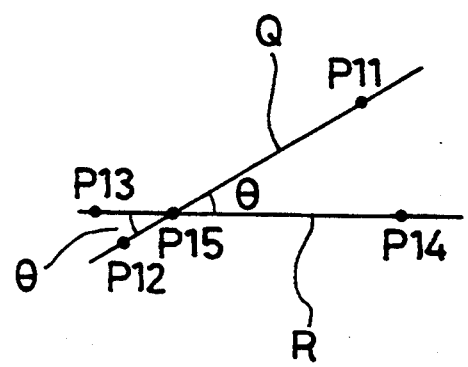
FIG. 18 is an explanatory diagram showing an another example of measuring an angle between two straight lines by the use of the electronic measuring apparatus.

The following deals with another example of how to obtain the angle between the two straight lines with reference to FIG. 18. More specifically, as shown in FIG. 18, a straight line Q connecting points P11 and P12 and a straight line R connecting points P13 and P14 intersect with each other within the main display 11 of the electronic measuring apparatus 1. In such case, a intersecting point P15 of the two straight lines Q and R is calculated in the above-mentioned manner. Thereafter, the angle $\theta$ between the two straight lines Q and R is obtained in the similar manner to FIG. 16. In order to avoid the overlap of the disclosure, the detail explanation is omitted here.

In such case, the angle $\theta$ calculated based on the points P11, P15 and P14 coincides with that calculated based on the points P13, P15 and P12 since such two angles are vertical angles. When only the two straight lines are thus specified, the angle $\theta$ between the two straight lines can be calculated. Note that the two straight lines can be generally identified when different three points are specified.

Figure 19:
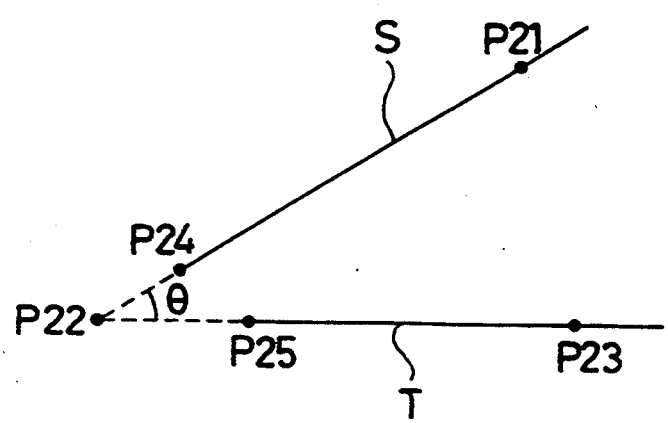
FIG. 19 is an explanatory diagram showing a still another example of measuring an angle between two straight lines by the use of the electronic measuring apparatus.
Figure 20:
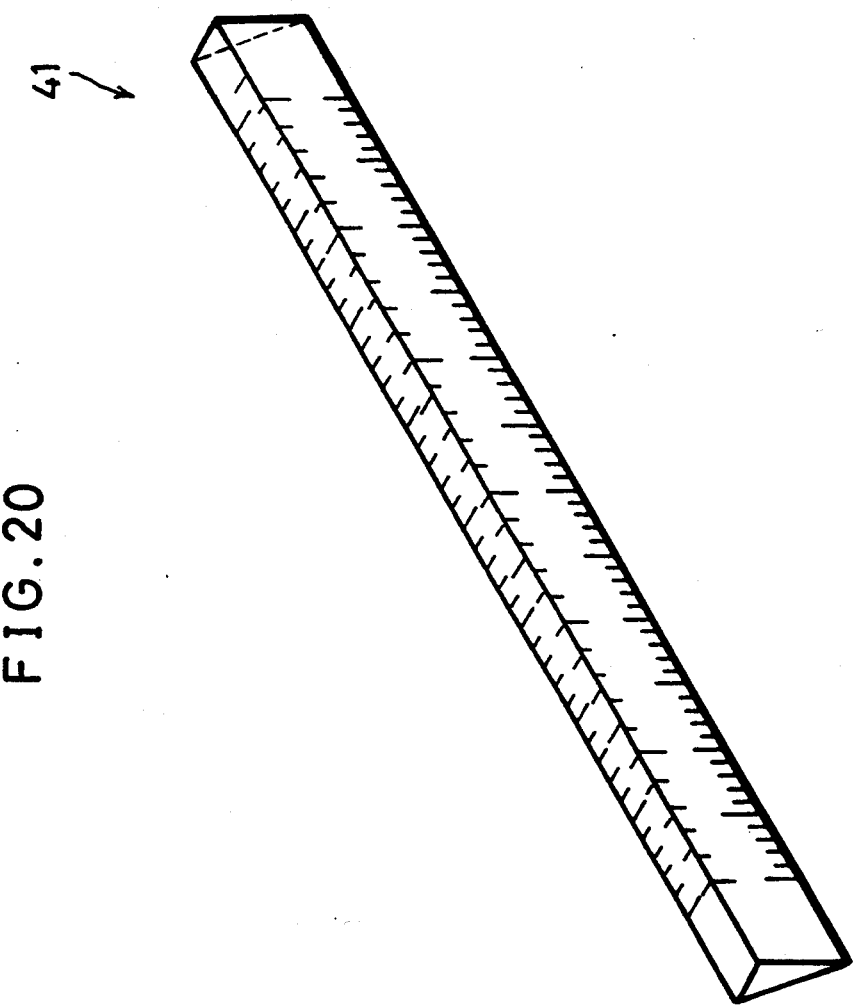
FIG. 20 is a perspective illustration showing a conventional triangular scale.

The following deals with still another example of how to obtain the angle between the two straight lines with reference to FIG. 19. More specifically, as shown in FIG. 19, a straight line S connecting points P21 and P24 and a straight line T connecting points P23 and P25 have the relation as shown in FIG. 19 within the main display 11 of the electronic measuring apparatus 1, i.e., the two straight lines S and T does not directly intersect with each other within the main display 11. In such case, a intersecting point P22 of the two straight lines S and T is calculated in the above-mentioned manner. Thereafter, the angle $\theta$ between the two straight lines Q and R is obtained in the similar manner to FIG. 16. In order to avoid the overlap of the disclosure, the detail explanation is omitted here.

Note that the foregoing disclosure deals with the way of obtaining an acute angle between the two straight lines. The obtuse angle between the two straight lines, therefore, can be calculated by $(360-\theta)$. However, instead of calculating the obtuse angle based on the calculated acute angle, it is preferable to instruct the calculating section 20 beforehand which one of the maximum angle $(=360-\theta)$ and the minimum angle $(\theta)$ should be shown on the display through the function keys group 4 so as to automatically show the specified acute angle or obtuse angle on the display. This arrangement improves the operability during the angle measurement. Note that the angle to be shown, i.e., the acute angle or obtuse angle, can be changed by re-instructing the specific angle.

The measured angle is indicated by the unit of degree for the convenience sake according to the foregoing disclosure. However, when a desired angle unit is specified through the function keys group 4, the measured angle θ can be converted into the specified angle unit. More specifically, for example, the unit conversions from degree (°) to radian (rad), from radian to grade (g), from grade to degree, and vice versa can be carried out with ease and with high speed through angle unit converting keys of the function keys group 4. Accordingly, the measuring of the angle can be carried out with high efficiency. The relation of 90 (°)=$\pi$/2 (rad)=100 (g) is considered for the angle unit conversion.

The angle between the two straight lines is measured according to the foregoing disclosure. However, the present invention is not restricted to the straight line. For example, the respective angles between two half lines, between two segment lines, between a half line and a segment line, between a straight line and a half line, and between a straight line and a segment line can be similarly measured.

The electronic measuring apparatus of the present invention as mentioned above is provided with:

plane entering means for entering graphic data of a measuring object by specifying a plurality of points;

graphic data generating means for generating coordinate data in response to the respective specified points within the plane entering means;

calculating means for carrying out a predetermined calculation based on the coordinate data and display means for displaying the calculated results of the calculating means.

Therefore, the desired calculations regarding the entered graphic data is swiftly carried out with high speed and accuracy only by specifying the points within the plane entering means. Accordingly, the present invention can measure with ease and high accuracy the measuring object which can not be measured without difficulty or can be measured with error, by the conventional scale.

When the calculating means is arranged such that a distance between the two points specified by the plane entering means is calculated, the distance between the two specified points can swiftly calculated with ease and accuracy.

When the calculating means is arranged such that a distance, along serially specified points, between a start point and an end point of the specified points of the plane entering means, the distance, along serially specified points of a curve, between the start point and the end point can swiftly calculated with ease and accuracy.

When the calculating means is arranged so as to calculate regional area of a closed-loop based on the coordinate data corresponding to a plurality of specified points by the plane entering means, the specified points specifying the closed-loop, the regional area of the graphic defined by the closed-loop-can swiftly calculated with ease and accuracy.

In the case where the calculating means calculates a diameter and a radius of a circle based on the coordinate data corresponding to the circle when the closed-loop forms the circle, the swiftly, accurately and easily calculated diameter and radius of the circle are shown by the display means, thereby remarkably improving the measuring accuracy. Accordingly, the arrangement can remarkably reduce the burden and fatigue which have been forced to the eyes, shoulders, and arms of the respective operators when they intend to measure the diameter and radius as accurate as possible.

When the electronic measuring apparatus is arranged so as to further comprise scale factor entering means for entering specific scale factor data and is arranged such that the calculating means calculates the conversion of the scale factor of the measuring object according to the specific scale factor data, the calculating means can carry out the desired scale factor conversion based only on the specified specific scale factor data. Accordingly, the present apparatus does not have the restrictions unlike the conventional scale. So, any kinds of scale factor conversion can swiftly calculated with ease and accuracy without a portable electronic calculator based only on the specified specific scale factor data.

When the electronic measuring apparatus is arranged such that unit conversion entering means for entering specific unit conversion data further comprises and the calculating means calculates the unit conversion of the measuring object according to the specific unit conversion data, the calculating means can carry out the desired unit conversion based only on the specified unit conversion data. Accordingly, the present apparatus does not have the restrictions unlike the conventional scale. So, any kinds of unit conversion can swiftly calculated with ease and accuracy without a portable electronic calculator based only on the specified unit conversion data.

When the plane entering means is a display, the display having a scope on which a cursor is displayed and the apparatus further comprises cursor operating means for moving the cursor within the scope, and specific point setting means for setting a cursor position of the scope as the specific point, the desired graphic data can be easily entered by specifying the points on the display.

When the plane entering means is a liquid crystal display having a touch sensor and the graphic data generating means generates the coordinate data in accordance with the pressed points on the display as the specified points, the graphic data can be easily entered to the display by pressing the specific points on the display. In the case where a plurality of points are serially specified, the specified points can be easily moved from one point to another. So, it is possible to enter a complicated graphic pattern such as a curve in a short time, which has required long time for entering the corresponding graphic data.

When the electronic measuring apparatus further comprises graphic trace indication controlling means for controlling the display so as to display a graphic connecting the specified points, the function that the display indicates the graphic connecting the specified points on the display is added, the graphic including the graphic having complicated shape, thereby improving the operability of the electronic measuring apparatus.

When the plane entering means is an external entering means and the apparatus further comprises a display for displaying a graphic connecting the specified points, a desired graphic is entered from the external entering means, and the entered graphic is displayed. Accordingly, the present electronic measuring apparatus is effective, like the liquid crystal display having a touch sensor, especially to the case where a complicated shape of graphic is entered.

In the case where the electronic measuring apparatus further comprises width dimension entering means for entering specific width dimension data and displayed line width changing means for changing a displayed line of the graphic on the display according to the specific width dimension data, when the displayed line of the graphic on the display is too fine or when the displayed line should be wider according to some reasons (or vice versa), the displayed line can be changed to that having a desired width dimension of line.

When the present electronic measuring apparatus further comprises deleting region entering means for entering specific deleting region data and re-display entering means for entering specific re-displaying data, and graphic changing means for deleting a predetermined region of the graphic on the display in accordance with the specific deleting region data and for storing the deleted graphic so as to re-display the deleted graphic based on the specific re-displaying data, the changing of the once entered graphic can be easily carried out. So, it is not necessary to re-enter the graphic data from the first, thereby improving the operability of the electronic measuring apparatus.

When the display means of the present apparatus is the above-mentioned kind of display and the apparatus further comprising calculated result indication controlling means for controlling the display so as to display the calculated results of the calculating means on a predetermined region of the display, the operability of the electronic measuring apparatus is remarkably improved.

When the electronic measuring apparatus further comprises entering keys, function keys group, computing means for computing according to the entered data through the entering keys and function keys group, computed result indication controlling means for controlling the display so as to display the computed results of the computing means on a predetermined region of the display, the operability of the electronic measuring apparatus is remarkably improved.

When the electronic measuring apparatus is a tracing base having a light source under the display, the display being a placing base of the measuring object, the electronic measuring apparatus has an ordinary function of the tracing base, i.e., a function of copying of a figure into another paper for example in addition to the function of the electronic measuring apparatus, since the apparatus has the tracing base having the light source under the display. With the arrangement, when the cursor or the entered graphic data on the display, even though the sheet on which the measuring object is drawn is placed on the display, the lightening of the light source permits the operator to recognize the graphic or cursor on the display through the sheet, thereby confirming whether or not the data of the measuring object are correctly entered. So, the electronic measuring apparatus having the high usefulness and good operability can be presented.

When the electronic measuring apparatus is arranged such that when two straight lines of not parallel with each other is specified within the plane entering means and the angle between the two straight lines is calculated according to the coordinate data of the lines, the angle between the two lines can be calculated only by specifying the points on the two straight lines. Moreover, it is not necessary to draw for the angle measurement, thereby avoiding that the drawing is dirty.

When the electronic measuring apparatus further comprises angle indication instructing means for instructing which one of the maximum angle and minimum angle between the two straight lines should be shown by the display means and the calculating means calculates the angle to be displayed based on the instructions, the automatical displaying of the specified angle is carried out upon instructing which one of the maximum angle and minimum angle should be shown. Accordingly, it is not necessary unlike the conventional to calculate the maximum angle by calculating (360°-the minimum angle) with the portable electronic calculator for each measuring, thereby remarkably improving the operability.

When the electronic measuring apparatus further comprises angle unit conversion entering means for entering specific angle unit conversion data and the calculating means carries out the unit conversion of the calculated angle according to the specific angle unit conversion data, it is not necessary unlike the conventional to calculate the angle unit conversions with the portable electronic calculator for each measuring only by entering the specific angle unit conversion data, thereby remarkably improving the operability.

There are described above features which the one skilled in the art will appreciate give rise to advantages. These are each independent aspects of the invention to be covered by the present application, irrespective of whether or not they are included within the scope of the following claims.

What is claimed is:

1. An electronic measuring apparatus comprising:
   plane entering means for entering graphic data of an object to be measured by specifying a plurality of points the plane entering means including a light transmitting display having a dot matrix pattern;
   graphic data generating means for generating coordinate data in response to the respective specified points within said plane entering means;
   calculating means for carrying out a predetermined calculation based on the coordinate data;
   display means for displaying the calculated results of said calculating means; and
   graphic trace indication controlling means for controlling the display so as to display inputted data on the display based on the coordinate data corresponding to the specified points simultaneously when the graphic data is inputted by the plane entering means.

2. The electronic measuring apparatus as set forth in claim 1, wherein said calculating means calculates a distance between the two specified points of said plane entering means.

3. The electronic measuring apparatus as set forth in claim 2, wherein said calculating means calculates a distance between a start point and an end point through serially specified points of said plane entering means, the distance being along the serially specified points.

4. The electronic measuring apparatus as set forth in claim 2 further comprising scale factor entering means for entering specific scale factor data, wherein said calculating means calculates the conversion of the scale factor of the measuring object according to the specific scale factor data.

5. The electronic measuring apparatus as set forth in claim 4 further comprising unit conversion entering means for entering specific unit conversion data, wherein said calculating means calculates the unit conversion of the measuring object according to the specific unit conversion data.

6. The electronic measuring apparatus as set forth in claim 4, wherein said display having a scope on which a cursor is displayed, said apparatus further comprising:
   cursor operating means for moving the cursor within the scope; and specific point setting means for setting a cursor position of the scope as the specific point.

7. The electronic measuring apparatus as set forth in claim 4, wherein said plane entering means includes a liquid crystal display having a touch sensor, a pressed point on said display being regarded as a specific point, and said graphic data generating means generates the coordinate data in response to the specified point.

8. The electronic measuring apparatus as set forth in claim 4, wherein said plane entering means includes external input entering means, and
said graphic trace indication controlling means displays a graphic connecting the specified points of said external input entering means on said display.

9. The electronic measuring apparatus as set forth in claim 2 further comprising unit conversion entering means for entering specific unit conversion data, wherein said calculating means calculates the unit conversion of the measuring object according to the specific unit conversion data.

10. The electronic measuring apparatus as set forth in claim 9, wherein said display having a scope on which a cursor is displayed, said apparatus further comprising:
cursor operating means for moving the cursor within the scope; and
specific point setting means for setting a cursor position of the scope as the specific point.

11. The electronic measuring apparatus as set forth in claim 9, wherein said plane entering means includes a liquid crystal display having a touch sensor, a pressed point on said display being regarded as a specific point, and said graphic data generating means generates the coordinate data in response to the specified point.

12. The electronic measuring apparatus as set forth in claim 9, wherein said plane entering means includes external input entering means, and
said graphic trace indication controlling means displays a graphic connecting the specified points of said external input entering means on said display.

13. The electronic measuring apparatus as set forth in claim 2, wherein said display having a scope on which a cursor is displayed, said apparatus further comprising:
cursor operating means for moving the cursor within the scope; and
specific point setting means for setting a cursor position of the scope as the specific point.

14. The electronic measuring apparatus as set forth in claim 2, wherein said plane entering means includes a liquid crystal display having a touch sensor, a pressed point on said display being regarded as a specific point, and said graphic data generating means generates the coordinate data in response to the specified point.

15. The electronic measuring apparatus as set forth in claim 2, wherein said plane entering means includes external input entering means, and
said graphic trace indication controlling means displays a graphic connecting the specified points of said external input entering means on said display.

16. The electronic measuring apparatus as set forth in claim 1, wherein said calculating means calculates a distance between a start point and an end point through serially specified points of said plane entering means, the distance being along the serially specified points.

17. The electronic measuring apparatus as set forth in claim 16 further comprising scale factor entering means for entering specific scale factor data, wherein said calculating means calculates the conversion of the scale factor of the measuring object according to the specific scale factor data.

18. The electronic measuring apparatus as set forth in claim 16 further comprising unit conversion entering means for entering specific unit conversion data, wherein said calculating means calculates the unit conversion of the measuring object according to the specific unit conversion data.

19. The electronic measuring apparatus as set forth in claim 16, wherein said display having a scope on which a cursor is displayed, said apparatus further comprising:
cursor operating means for moving the cursor within the scope; and
specific point setting means for setting a cursor position of the scope as the specific point.

20. The electronic measuring apparatus as set forth in claim 16, wherein said plane entering means includes a liquid crystal display having a touch sensor, a pressed point on said display being regarded as a specific point, and said graphic data generating means generates the coordinate data in response to the specified point.

21. The electronic measuring apparatus as set forth in claim 16, wherein said plane entering means includes external input entering means, and
said graphic trace indication controlling means displays a graphic connecting the specified points of said external input entering means on said display.

22. The electronic measuring apparatus as set forth in claim 1 wherein the display has front and back surfaces;
said display further including means for displaying an object to be measured on an item at said front surface when the item is adjacent to said back surface.

23. An electronic measuring apparatus comprising:
plane entering means for entering graphic data of an object to be measured by specifying a plurality of points the plane entering means including a light transmitting display having a dot matrix pattern;
graphic data generating means for generating coordinate data in response to the respective specified points within said plane entering means;
calculating means for calculating a regional area of a closed-loop based on the respective coordinate data corresponding to serially specified points of said plane entering means, the serially specified points defining the closed-loop; and
display means for displaying the calculated results of said calculating means; and
graphic trace indication controlling means for controlling the display so as to display inputted data on the display based on the coordinate data corresponding to the specified points simultaneously when the graphic data is inputted by the plane entering means.

24. The electronic measuring apparatus as set forth in claim 23 further comprising scale factor entering means for entering specific scale factor data, wherein said calculating means calculates the conversion of the scale factor of the measuring object according to the specific scale factor data.

25. The electronic measuring apparatus as set forth in claim 23 further comprising unit conversion entering means for entering specific unit conversion data, wherein said calculating means calculates the unit conversion of the measuring object according to the specific unit conversion data.

26. The electronic measuring apparatus as set forth in claim 23, wherein said display having a scope on which a cursor is displayed, said apparatus further comprising:

cursor operating means for moving the cursor within the scope; and specific point setting means for setting a cursor position of the scope as the specific point.

27. The electronic measuring apparatus as set forth in claim 23, wherein said plane entering means includes a liquid crystal display having a touch sensor, a pressed point on said display being regarded as a specific point, and said graphic data generating means generates the coordinate data in response to the specified point.

28. The electronic measuring apparatus as set forth in claim 23, wherein said plane entering means includes external input entering means, and said graphic trace indication controlling means displays a graphic connecting the specified points of said external input entering means on said display.

29. The electronic measuring apparatus as set forth in claim 23, wherein said calculating means calculates a diameter and a radius of a circle based on the coordinate data corresponding to the circle when the closed-loop defines the circle.

30. The electronic measuring apparatus as set forth in claim 23 wherein the display has front and back surfaces;

said display further including means for displaying an object to be measured on an item at said front surface when the item is adjacent to said back surface.

31. An electronic measuring apparatus comprising:

plane entering means including a light transmitting display having a dot matrix pattern, and a scope on which a cursor is displayed;

cursor operating means for moving the cursor within the scope;

specific point setting means for setting a cursor position of the scope as the specific point;

graphic data generating means for generating coordinate data in response to the specified points;

calculating means for carrying out a predetermined calculation according to the coordinate data for each measuring;

display means for displaying the calculated results of said calculating means; and graphic trace indication controlling means for controlling the display so as to display inputted data on the display based on the coordinate data corresponding to the specified points simultaneously when the graphic data is inputted by the plane entering means.

32. The electronic measuring apparatus as set forth in claim 31, wherein said plane entering means includes a liquid crystal display having a touch sensor, a pressed point on said display being regarded as a specific point, and said graphic data generating means generates the coordinate data in response to the specified point.

33. The electronic measuring apparatus as set forth in claim 31 further comprising graphic trace indication controlling means for controlling the display so as to indicate a graphic connecting the specified points.

34. The electronic measuring apparatus as set forth in claim 33 further comprising:

deleting region entering means for entering specific deleting region data;

re-display entering means for entering specific re-displaying data; and graphic changing means for deleting a predetermined region of the graphic on the display in accordance with the specific region data, and for storing the deleted graphic so as to re-display the deleted graphic based on the specific re-displaying data.

35. The electronic measuring apparatus as set forth in claim 34 further comprising:

entering keys;

function keys group;

computing means for computing according to the entered data through the entering keys function keys group;

computed result indication controlling means for controlling the display so as to display the computed results of the computing on a predetermined region of the display.

36. The electronic measuring apparatus as set forth in claim 33 further comprising:

entering keys;

function keys group;

computing means for computing according to the entered data through the entering keys and function keys group; and computed result indication controlling means for controlling the display so as to display the computed results of the computing means on a predetermined region of the display.

37. The electronic measuring apparatus as set forth in claim 31 wherein the display has front and back surfaces;

said display further including means for displaying an object to be measured on an item at said front surface when the item is adjacent to said back surface.

38. An electronic measuring apparatus comprising:

plane entering means, including a liquid crystal display having a touch sensor which is light transmitting, for entering a pressed point on said display as a specific point;

graphic data generating means for generating coordinate data in response to the specified points;

calculating means for carrying out a predetermined calculation for each measuring according to the coordinate data;

display means for displaying the calculated results of said calculating means; and graphic trace indication controlling means for controlling the display so as to display inputted data on the display based on the coordinate data corresponding to the specified points simultaneously when the graphic data is inputted by the plane entering means.

39. The electronic measuring apparatus as set forth in claim 38 further comprising graphic trace indication controlling means for controlling the display so as to indicate a graphic connecting the specified points.

40. The electronic measuring apparatus as set forth in claim 38 further comprising:

entering keys;

function keys group;

computing means for computing according to the entered data through the entering keys and function keys group; and computed result indication controlling means for controlling the display so as to display the computed results of the computing means on a predetermined region of the display.

41. An electronic measuring apparatus comprising:

external entering means for externally entering graphic data of an object to be measured by specifying a plurality of points;

graphic data generating means for generating coordinate data in response to the specified point of said external entering means;

a display for displaying a graphic connecting the specified points of said external entering means in response to the coordinate data;

calculating means for carrying out a predetermined calculation for each measuring according to the coordinate data; and display means for displaying the calculated results of said calculating means.

42. The electronic measuring apparatus as set forth in claim 41 further comprising:

width dimension entering means for entering specific width dimension data; and displayed line width changing means for changing a displayed line of the graphic on the display according to the specific width dimension data.

43. The electronic measuring apparatus as set forth in claim 41 further comprising:

deleting region entering means for entering specific deleting region data;

re-display entering means for entering specific re-displaying data; and graphic changing means for deleting a predetermined region of the graphic on the display in accordance with the specific deleting region data, and for storing the deleted graphic so as to re-display the deleted graphic based on the specific re-displaying data.

44. The electronic measuring apparatus as set forth in claim 41 further comprising:

entering keys;

function keys group;

computing means for computing according to the entered data through the entering keys and function keys group; and computed result indication controlling means for controlling the display so as to display the computed results of the computing means on a predetermined region of the display.

45. The electronic measuring apparatus as set forth in claim 41 wherein the display has front and back surfaces;

said display further including means for displaying an object to be measured on an item at said front surface when the item is adjacent to said back surface.

46. An electronic measuring apparatus comprising:

plane entering means including a display having a scope on which a cursor is displayed;

cursor operating means for moving the cursor within the scope;

specific point setting means for setting a cursor position of the scope as the specific point;

graphic data generating means for generating coordinate data in response to the specified points;

graphic trace indication controlling means for controlling the display so as to indicate a graphic connecting the specified points;

width dimension entering means for entering specific width dimension data;

displayed line width changing means for changing a displayed line of the graphic on the display according to the specific width dimension data;

calculating means for carrying out a predetermined calculation according to the coordinate data for each measuring; and display means for displaying the calculated results of said calculating means.

47. The electronic measuring apparatus as set forth in claim 46 further comprising:

deleting region entering means for entering specific deleting region data;

re-display entering means for entering specific re-displaying data; and graphic changing means for deleting a predetermined region of the graphic on the display in accordance with the specific deleting region data, and for storing the deleted graphic so as to re-display the deleted graphic based on the specific re-displaying data.

48. The electronic measuring apparatus as set forth in claim 34 further comprising:

entering keys;

function keys group;

computing means for computing according to the entered data through the entering keys and function keys group; and computed result indication controlling means for controlling the display so as to display the computed results of the computing means on a predetermined region of the display.

49. The electronic measuring apparatus as set forth in claim 46 wherein the display has front and back surfaces;

said display further including means for displaying an object to be measured on an item at said front surface when the item is adjacent to said back surface.

50. An electronic measuring apparatus comprising:

plane entering means for entering graphic data of straight lines by specifying a plurality of points the plane entering means including a light transmitting display having a dot matrix pattern;

graphic data generating means for generating coordinate data in response to the specified points within said plane entering means;

calculating means for carrying out a predetermined calculation according to the coordinate data for each measuring; and display means for displaying the calculated results of said calculating means, wherein said calculating means calculates an angle between two straight lines, not parallel with each other, based on the coordinate data when the two straight lines are specified within the plane entering means; and graphic trace indication controlling means for controlling the display so as to display inputted data on the display based on the coordinate data corresponding to the specified points simultaneously when the graphic data is inputted by the plane entering means.

51. The electronic measuring apparatus as set forth in claim 50 further comprising angle indication instructing means for instructing which one of a maximum angle and minimum angle between the two straight lines should be displayed by the display means, wherein said calculating means calculates the angle to be displayed based on the instructions.

52. The electronic measuring apparatus as set forth in claim 51 further comprising angle unit conversion entering means for entering specific angle unit conversion data, wherein said calculating means carries out the unit conversion of the calculated angle according to the specific angle unit conversion data.

53. The electronic measuring apparatus as set forth in claim 50 further comprising angle unit conversion entering means for entering specific angle unit conversion data, wherein said calculating means carries out the unit conversion of the calculated angle according to the specific angle unit conversion data.

54. An electronic measuring apparatus comprising:
   transparent entering means for entering graphic data of an item to be measured on an object by specifying a plurality of points;
   graphic data generating means for generating coordinate data in response to the respective specified points;
   calculating means for carrying out a predetermined calculation based on the coordinate data; and
   display means for displaying the calculated results of said calculating means.

55. The electronic measuring apparatus as set forth in claim 54 wherein said plurality points are specified within the entering means.

56. The electronic measuring apparatus as set forth in claim 55 wherein said entering means includes a display.

57. The electronic measuring apparatus as set forth in claim 56, wherein said display includes a scope on which a cursor is displayed.

58. The electronic measuring apparatus as set forth in claim 57 wherein said display is planer in shape.

59. The electronic measuring apparatus as set forth in claim 38 further comprising:
   entering keys;
   function keys group;
   computing means for computing according to the entered data through the entering keys and function keys group;
   computed result indication controlling means for controlling the display so as to display the computed results of the computing means on a predetermined region of the display.

* * * * *